United States Patent
Veerabhadrappa et al.

(10) Patent No.: US 11,351,604 B2
(45) Date of Patent: Jun. 7, 2022

(54) METHODS FOR PREPARING MIXED-METAL OXIDE DIAMONDOID NANOCOMPOSITES AND CATALYTIC SYSTEMS INCLUDING THE NANOCOMPOSITES

(71) Applicants: Saudi Arabian Oil Company, Dhahran (SA); Durham University, Durham (GB)

(72) Inventors: Manohara Gudiyor Veerabhadrappa, Durham (GB); Hugh Christopher Greenwell, Durham (GB); Andrew Whiting, Durham (GB); John Adrian Hall, Dhahran (SA); Gasan Alabedi, Cheshire (GB)

(73) Assignees: Saudi Arabian Oil Company, Dhahran (SA); Durham University, Durham (GB)

( * ) Notice: Subject to any disclaimer, the term of this patent is extended or adjusted under 35 U.S.C. 154(b) by 19 days.

(21) Appl. No.: 17/101,282

(22) Filed: Nov. 23, 2020

(65) Prior Publication Data
US 2021/0086261 A1 Mar. 25, 2021

Related U.S. Application Data

(62) Division of application No. 15/966,312, filed on Apr. 30, 2018, now Pat. No. 10,875,092.

(60) Provisional application No. 62/508,672, filed on May 19, 2017.

(51) Int. Cl.
| | | |
|---|---|---|
| *B22F 1/00* | (2022.01) | |
| *B22F 1/17* | (2022.01) | |
| *C01B 32/28* | (2017.01) | |
| *C01F 7/02* | (2022.01) | |
| *B01J 37/08* | (2006.01) | |
| *B01J 23/00* | (2006.01) | |
| *B01J 37/18* | (2006.01) | |
| *B01J 35/00* | (2006.01) | |
| *B82Y 30/00* | (2011.01) | |
| *B82Y 35/00* | (2011.01) | |
| *B01J 31/04* | (2006.01) | |
| *B82Y 40/00* | (2011.01) | |

(52) U.S. Cl.
CPC .............. *B22F 1/17* (2022.01); *B01J 23/007* (2013.01); *B01J 35/002* (2013.01); *B01J 37/088* (2013.01); *B01J 37/18* (2013.01); *C01B 32/28* (2017.08); *C01F 7/02* (2013.01); *B01J 31/04* (2013.01); *B22F 2201/013* (2013.01); *B22F 2301/052* (2013.01); *B22F 2301/058* (2013.01); *B22F 2302/406* (2013.01); *B22F 2303/20* (2013.01); *B82Y 30/00* (2013.01); *B82Y 35/00* (2013.01); *B82Y 40/00* (2013.01); *C01P 2002/22* (2013.01); *C01P 2002/72* (2013.01); *C01P 2002/82* (2013.01); *C01P 2002/85* (2013.01); *C01P 2002/86* (2013.01); *C01P 2004/03* (2013.01); *C01P 2004/04* (2013.01)

(58) Field of Classification Search
CPC .......... B22F 1/025; B01J 23/007; B01J 23/02; B01J 23/002; B01J 35/023; B01J 35/002; B01J 35/026; B01J 37/088; B01J 37/18; B01J 21/10; B01J 31/04; B01J 27/236; C01F 7/162; C01F 5/06; C01F 5/12; C01B 32/154; C01B 32/158; C01B 32/16; C01B 32/18; C01B 32/184; C01B 32/05; C04B 2237/385; B82Y 40/00
See application file for complete search history.

(56) References Cited

U.S. PATENT DOCUMENTS

| | | | |
|---|---|---|---|
| 3,342,880 A | 9/1967 | Heinz | |
| 3,671,432 A | 6/1972 | Peters et al. | |
| 4,021,371 A | 5/1977 | Petro et al. | |
| 4,419,222 A | 12/1983 | Grenoble et al. | |
| 4,774,212 A | 9/1988 | Drezdon | |
| 4,952,748 A | 8/1990 | Alexander et al. | |

(Continued)

FOREIGN PATENT DOCUMENTS

| | | |
|---|---|---|
| CA | 2594060 A1 | 6/2006 |
| CN | 105017485 A | 11/2015 |

(Continued)

OTHER PUBLICATIONS

Wang, et al., "Synthesis of high-temperature CO2 adsorbents from organo-layered double hydroxides with markedly improved CO2 capture capacity" The Royal Society of Chemistry, 2012, vol. 5, 7526-7530, Energy Environ. Sci.

(Continued)

Primary Examiner — Steven J Bos
(74) Attorney, Agent, or Firm — Dinsmore & Shohl LLP

(57) ABSTRACT

Methods for preparing a layered metal nanocomposite and a layered metal nanocomposite. The method includes mixing a magnesium salt and an aluminum salt to form a $Mg^{2+}/Al^{3+}$ solution. The Mg/Al has a molar ratio of between 0.5:1 to 6:1. Then a diamondoid compound is added to the $Mg^{2+}/Al^{3+}$ solution to form a reactant mixture. The diamondoid compound has at least one carboxylic acid moiety. The reactant mixture is heated at a reaction temperature for a reaction time to form a Mg/Al-diamondoid intercalated layered double hydroxide. The Mg/Al-diamondoid intercalated layered double hydroxide is thermally decomposed under a reducing atmosphere for a decomposition time at a decomposition temperature to form the layered metal nanocomposite.

20 Claims, 11 Drawing Sheets

(56) References Cited

U.S. PATENT DOCUMENTS

| | | |
|---|---|---|
| 4,956,481 A | 9/1990 | Gillaspey et al. |
| 5,021,184 A | 6/1991 | Gillaspey et al. |
| 5,073,532 A | 12/1991 | Domesle et al. |
| 5,260,495 A | 11/1993 | Forkner |
| 5,326,891 A | 7/1994 | Breuer et al. |
| 5,399,329 A | 3/1995 | Schutz et al. |
| 5,635,457 A | 6/1997 | Van Slyke |
| 5,883,041 A | 3/1999 | Pak et al. |
| 6,096,690 A | 8/2000 | Wittenbrink et al. |
| 6,323,270 B1 | 11/2001 | Ishida |
| 6,410,635 B1 | 6/2002 | Kaylo et al. |
| 6,429,314 B1 | 8/2002 | Ishii et al. |
| 7,098,366 B2 | 8/2006 | Sigl et al. |
| 7,129,287 B1 | 10/2006 | Lee et al. |
| 7,557,063 B2 | 7/2009 | Hagemeyer et al. |
| 7,582,202 B2 | 9/2009 | Jones et al. |
| 7,918,935 B2 | 4/2011 | Park et al. |
| 8,034,867 B2 | 10/2011 | Abarca et al. |
| 8,088,349 B2 | 1/2012 | Duan et al. |
| 8,158,843 B2 | 4/2012 | Song et al. |
| 8,613,900 B2 | 12/2013 | Frei et al. |
| 8,652,994 B2 | 2/2014 | Li et al. |
| 10,105,684 B2 | 10/2018 | Veerabhadrappa et al. |
| 2002/0010520 A1 | 1/2002 | Matsubara et al. |
| 2002/0058601 A1 | 5/2002 | Jordan, IV et al. |
| 2008/0108498 A1 | 5/2008 | Duan et al. |
| 2008/0207801 A1 | 8/2008 | Ton-That et al. |
| 2010/0279848 A1 | 11/2010 | Iyi et al. |
| 2011/0237430 A1 | 9/2011 | Zhang et al. |
| 2011/0248314 A1 | 10/2011 | Takei et al. |
| 2012/0058739 A1 | 3/2012 | McKinzie, III et al. |
| 2012/0258857 A1 | 10/2012 | Pham et al. |
| 2012/0312344 A1 | 12/2012 | Delorme |
| 2012/0322694 A1 | 12/2012 | Monteiro et al. |
| 2013/0116351 A1 | 5/2013 | Querner et al. |
| 2013/0143731 A1 | 6/2013 | Li et al. |
| 2013/0172642 A1 | 7/2013 | Behrens et al. |
| 2013/0200299 A1 | 8/2013 | Mazyar et al. |
| 2013/0260990 A1 | 10/2013 | Kwon et al. |
| 2014/0113196 A1 | 4/2014 | Balaya et al. |
| 2015/0027710 A1 | 1/2015 | Miller |
| 2017/0029375 A1 | 2/2017 | Harichian et al. |
| 2017/0266642 A1 | 9/2017 | Veerabhadrappa et al. |
| 2017/0266643 A1 | 9/2017 | Veerabhadrappa et al. |
| 2017/0267620 A1 | 9/2017 | Veerabhadrappa et al. |
| 2017/0267623 A1 | 9/2017 | Veerabhadrappa et al. |
| 2017/0267910 A1 | 9/2017 | Mohammed et al. |

FOREIGN PATENT DOCUMENTS

| | | |
|---|---|---|
| EP | 1419817 A1 | 5/2004 |
| EP | 1952885 A1 | 8/2008 |
| EP | 2263976 A1 | 12/2010 |
| JP | 2012028989 A1 | 3/2012 |
| JP | 2013537877 A | 10/2013 |
| KR | 20130101038 A | 9/2013 |
| WO | 0224756 A2 | 3/2002 |
| WO | 2013007993 A2 | 1/2013 |
| WO | 2013072197 A1 | 5/2013 |
| WO | 2014037378 A1 | 3/2014 |
| WO | 2014052510 A1 | 4/2014 |
| WO | 2014080428 A1 | 5/2014 |
| WO | 2015086428 A1 | 6/2018 |

OTHER PUBLICATIONS

Westerhaus et al., "Heterogenized Cobalt Oxide Catalysts for Nitroarene Reduction by Pyrolysis of Molecularly Defined Complexes", Nature Chemistry, 2013, 5, 537-543.

White et al., Supported metal nanoparticles on porous materials. Methods and Applications; The Royal Society of Chemistry 2009, vol. 38, 481-494, Chemical Society Reviews.

Williams, et al., "Towards understanding, control and application of layered double hydroxide chemistry", Journal of Materials Chemistry, 2006, vol. 16, 3065-3074, Journal of Materials Chemistry.

Written Opinion dated Jul. 13, 2017, pertaining to PCT/US2017/021550, filed Mar. 9, 2017, 13 pages.

Written Opinion dated Jul. 13, 2017, pertaining to PCT/US2017/022485, filed Mar. 15, 2017, 11 pages.

Xie et al., "Low-Temperature Oxidation of CO Catalysed by Co3O4 Nanorods", Nature, 2009, 458, 746-749, Macmilian Publishers Limited.

Xu et al., "Surface Area and Thermal Stability Effect of the MgO Supported Catalysts for the Synthesis of Carbon Nanotubes", Journal of Materials Chemistry, 2008, 18, 5738-5745, The Royal Society of Chemistry.

Yao, et al., "Confined adamantane molecules assembled to one dimension in carbon nanontubes" Carbon, 2011, vol. 49, 1159-1166, Elsevier Ltd.

Yavuz, et al., "Markedly Improved CO2 Capture Efficiency and Stability of Gallium Substituted Hydrotalcites at Elevated Temperatures" Chem. Mater. 2009, vol. 21, 3473-3475, American Chemical Society.

Zhang et al., "Hydrogen Production via the Direct Cracking of Methane Over Silica-Supported Nickel Catalysts", Applied Catalysts A: General, 1998, 167, 161-172, Elsevier B.V.

Zhang et al., "Synthesis and Transformation of Linear Adamantane Assemblies Inside Carbon Nanotubes", ACS Nano, 6:10, 8674-8683.

Zhuang et al., "Comparative Study on the use of Cationic-Nonionic-Organo-Montmorillonite in Oil-Based Drilling Fluids", Applied Clay Science, 2015, 116-117, 257-262, Elsevier B.V.

Non-Final Office Action dated Jan. 5, 2018 pertaining to U.S. Appl. No. 15/453,106, filed Mar. 8, 2017.

Non-Final Office Action dated Jan. 5, 2018 pertaining to U.S. Appl. No. 15/453,180, filed Mar. 8, 2017.

Vittal, The Chemistry of Inorganic and Organometallic Compounds with Adamantane-Like Structures.: Polyhedron, vol. 15, No. 10, pp. 1585-1642 (1996).

Non-Final Office Action dated Apr. 23, 2018 pertaining to U.S. Appl. No. 15/449,347, filed Mar. 3, 2017.

U.S. Non-Final Office Action dated May 25, 2018, pertaining to U.S. Appl. No. 15/449,207.

Office Action pertaining to U.S. Appl. No. 15/453,056 dated Jul. 10, 2018.

International Search Report and Written Opinion dated Aug. 10, 2018 pertaining to International Application No. PCT/US2018/030399, 15 pages.

U. Costantino et al., "Preparation and characterisation of hydrotalcite/carboxyadamantane intercalation compounds as fillers of polymeric nanocomposites", Journal of Materials Chemistry, 2007, vol. 17, pp. 1076-1086, www.rsc.org/materials, UK.

Makoto Ogawa, et al., "Hydrothermal Synthesis of Layered Double Hydroxide-Deoxycholate Intercalation Compounds", Chemical Materials, 2000, vol. 12, pp. 3253-3255, USA.

Kumar et al., "Sonochemical Synthesis and Characterization of Nanometer-Size Transition Metal Oxides from Metal Acetates", Chem. Mater., 2000, 12, 2301-2305, American Chemical Society.

Zhao, et al., "Carbon Nanowire Made of a Long Lineal Carbon Chain Inserted Inside a Multiwalled Carbon Nanotube", Physical Review Letters, 2003, vol. 90, No. 18,187401-1-187401-4, The American Physical Society.

Office Action for Japanese Application No. 2019-500217 dated Nov. 20, 2019.

Iyi, Nobuo et al., One-Pot Synthesis of Organophilic Layered Double Hydroxidees (LDHs) Containing Aliphatic Carboxylates: Extended "Homogeneous Precipitation" Method, Journal of Colloid and Interface Science, vol. 340, 2009, pp. 67-73, Japan.

First Office Action pertaining to GC patent application No. 2017-33077, dated Apr. 14, 2019, 3 pages.

First Office Action pertaining to GC patent application No. 2017-33068, dated Apr. 11, 2019, 3 pages.

Office Action dated Apr. 17, 2020 pertaining to U.S. Appl. No. 16/157,542, filed Oct. 11, 2018, 55 pgs.

Office Action pertaining to Korean Application No. 10-2018-7029901 dated Apr. 10, 2020, 6 pgs.

(56) References Cited

OTHER PUBLICATIONS

Office Action dated May 26, 2020 pertaining to U.S. Appl. No. 15/966,312, filed Apr. 30, 2018, 9 pgs.

Saliba, D. et al. "Kinetics of intercalation of fluorescent probes in magnesium-aluminum layered double hydroxide within a multiscale reaction-diffusion framework" in Philosophical Transactions Royal Soc. A 374: 20160138 (Aug. 2016), pp. 1-14, downloaded May 20, 2020 from http://dx.dox.org/10.1098/ rsta.2016.0138. (Year: 2016).

Office Action dated Jun. 12, 2020 pertaining to U.S. Appl. No. 15/971,634, filed May 4, 2018, 8 pgs.

Examination Report dated Feb. 17, 2019 pertaining to GC Application No. 2017-33078 filed Mar. 19, 2017, 3 pgs.

Examination Report dated May 8, 2019 pertaining to GC Application No. 2017-33063, filed Mar. 15, 2017, 5 pgs.

U.S. Notice of Allowance and Fee(s) Due dated Aug. 26, 2020 pertaining to U.S. Appl. No. 15/966,312 filed Apr. 30, 2018, 84 pgs.

Office Action dated Jul. 15, 2020 pertaining to U.S. Appl. No. 16/157,542, filed Oct. 11, 2018, 14 pgs.

Abdo et al., "Clay Nanoparticles Modified Drilling Fluids for Drilling of Deep Hydrocarbon Wells", Applied Clay Science, 2013, 86, 76-82, Elsevier B.V.

Abdou et al., "Evaluation of Egyptian Bentonite and Nano-Bentonite as Drilling Mud", Egyptian Journal of Petroleum, 2013, 22, 53-59, Egyptian Petroleum Research Institute.

Alvarado et al., "Preparation and Characterization of MgO Powders Obtained from Different Magnesium Salts and the Mineral Dolomite", Polyhedron, 2000, 19, 2345-2351, Elsevier Science B.V.

Baltes et al., "Synthesis of Supported Transition Metal Oxide Catalysts by the Designed Deposition of Acetylacetonate Complexes", Langmuir, 1999, 15, 5841-5845, American Chemical Society.

Bednorz et al., "Possible High Tc Superconductivity in the Ba—La—Cu—O System", Condensed Matter, 1986, 64, 189-193, Springer-Verlag.

Bernholc et al., "Bronsted Acid Sites in Transition Metal Oxide Catalysts: Modeling of Structure, Acid Strengths, and Support Effects", J Phys. Chem., 1987, 91, 1526-1530, American Chemical Society.

Cao et al., "Mg(OH)2 Complex Nanostructures with Superhydrophobicity and Flame Retardant Effects", J. Phys. Chem., 2010, 114, 17362-17368, American Chemical Society.

Cao et al., "Ultra-High Capacity Lithium-Ion Batteries with Hierarchical CoO Nanowire Clusters as Binder Free Electrodes", Advanced Functional Materials, 2015, 25, 1082-1089, Wiley-VCH Verlag GmbH & Co.

Cavani et al., Hydrotalcite-Type Anionic Clays: Preparation, Properties and Applications, Catalysis Today, vol. 11, 1991, 173-301, Elsevier Science Publishers B.V.

Chang, et al., "Ca-Rich Ca—Al-Oxide, High-Temperature-Stable Sorbents Prepared from Hydrotalcite Precursors Synthesis, Characterization, and CO2 Capture Capacity", ChemSusChem, 2011, vol. 4, 1844-1851, Wiley-VCH.

Chen et al., "Cu2(ATC) 6H2O: Design of Open Metal Sites in Porous Metal-Organic Crystals (ATC: 1,3,5,70Adamantane Tetracarboxylate", J. Am. Chem. Soc., 2000, 122,11559-11560.

Chen, et al., "Preparation and Characterization of Flexible Asymmetric Supercapacitors Based on Transition-Metal-Oxide Nanowire/Single-Walled Carbon Nanotube Hybrid Thin-Film Electrodes", ACSNano, 2010, vol. 4, No. 8, 4403-4411, American Chemical Society.

Choudary et al., "Benzylation of Aromatic Compounds with Different Crystallites of Mgo", Journal of American Chemical Society, 2003, 125, 2020-2021, American Chemical Society.

Crepaldi, et al., Sorption of terephthalate anions by calcined and uncalcined hydrotalcite-like compounds, Colloids and Surfaces A: Physicochem. Eng. Aspects 211, vol. 211, No. 2-3, Jun. 4, 2002, pp. 103-114, Amsterdam, Netherlands.

Damodara et al., "Copper Nanoparticles from Copper Aluminum Hydrotalcite: An Efficient Catalyst for Acceptor- and Oxidant-Free Dehydrogenation of Amines and Alcohols", Adv. Synth. Catal., 2014, vol. 356,189-198, Wiley-VCH.

Di Cosimo et al., "Basic Catalysis on MgO: Generation, Characterization and Catalytic Properties of Active Sites", Catalysis, 2014, 26, 1-28.

Del Arco et al., "Release studies of different NSAIDS encapsulated in Mg, AL, Fe-hydrotalcites" Applied Clay Science, vol. 42, 2009, 538-544, Elsevier B.V.

Ding, et al., "Equilibria and kinetics of CO2 absorption on hydrotalcite adsorbent" Chemical Engineering Science, 2000, vol. 55, 3461-3474, Elsevier Science Ltd.

Gardolinski et al., "Grafted Organic Derivatives of Kaolinite: I. Synthesis, Chemical and Rheological Characterization", Clay Minerals, 2005, 40, 537-546, The Mineralogical Society.

Gardolinski et al., "Grafted organic derivatives of kaolinite: II. Intercalation of primary n-alkylamines and delamination", Clay Minerals, 2005, vol. 40, 547-556, The Mineralogical Society.

Goh, et al. "Application of layered double hydroxides for removal of oxyanions: A review", Water Research (2008) pp. 1343-1368.

Guo et al., "A Comprehensive Review on Synthesis Methods for Transition-Metal Oxide Nanostructures", CrystEngComm, 2015, 17, 3551-3585, The Royal Society of Chemistry.

Haber, Jerzy, "Catalysis by Transition Metal Oxides", ACS Symposium Series, Washington D.C., 1985, Grasselli and Brazdil: Solid State Chemistry in Catalysis, American Chemical Society.

Hermoso et al., "Influence of Viscosity Modifier Nature and Concentration on the Viscous Flow Behaviour of Oil-Based Drilling Fluids at High Pressure", Applied Clay Science, 2014, 87, 14-21, Elsevier B.V.

Hsueh et al., "Preparation and Properties of LDHs/Epoxy Nanocomposites", Polymer, 2003, 44, 5275-5283, Elsevier Ltd.

Huang et al., "Controllable Preparation of Nano-MgO and Investigation of its Bactericidal Properties", Journal of Inorganic Biochemistry, 2005, 99, 986-996.

Huang et al., "Removal of NO by Reversible Adsorption on Fe—Mn Based Transition Metal Oxides", Langmuir, 2001, 17, 4997-5003, American Chemical Society.

International Search Report and Written Opinion pertaining to PCT/US2017/021135 dated Jun. 12, 2017.

International Search Report and Written Opinion pertaining to PCT/US2017/021478 dated May 29, 2017.

International Search Report and Written Opinion pertaining to PCT/US2017/022427 dated Jun. 12, 2017.

International Search Report dated Jul. 13, 2017, pertaining to PCT/US2017/021550, filed Mar. 9, 2017, 8 pages.

International Search Report dated Jul. 13, 2017, pertaining to PCT/US2017/022485, filed Mar. 15, 2017, 7 pages.

Itoh, et al., Nanoscale Metal Oxide Particles as Chemical Reagents. Intrinsic Effects of Particle Size on Hydroxyl Content and on Reactivity and Acid/Base Properties of Ultrafine Magnesium Oxide, Chem. Mater. 1993, vol. 5, 71-77, American Chemical Society.

Li, Jagadeesh et al., "Selective Oxidation of Alcohols to Esters Using Heterogeneous Co3O4-N@C Catalysts Under Mild Conditions", Journal of the American Chemical Society, 2013, 135, 10776-10782, American Chemical Society.

Jiancheng et al., "A New Type of Whole Oil-Based Drilling Fluid", Petrol. Explor. Develop., 2014, 41(4), 538-544, Elsevier B.V.

Johnson, Mark, "Spintronics", J. Phys. Chem. B, 2005, 109, 14278-14291, American Chemical Society.

Kanezaki, "Unexchangeable Interlayer Anions: Synthesis and Characterization of Zn/Al- and Mg/A1-Layered Double Hydroxides with Interlayer Alizarin red S", Journal of Inclusion Phenomena and Macrocyclic Chemistry, Jun. 1, 2003, pp. 89-95, https://rd.springer.com.

Kelkar et al., "Ni-, Mg- and Co-Containing Hydrotalcite-Like Materials with a Sheet-Like Morphology: Synthesis and Characterization", Microporous Materials, 1997, 10, 163-172, Elsevier Science BV.

Khan, et al., "Intercalation chemistry of layered double hydroxides: recent developments and applications", Journal of Materials Chemistry, 2002, vol. 12, 3191-3198, The Royal Society of Chemistry.

(56) References Cited

OTHER PUBLICATIONS

Khan, et al., The intercalation of bicyclic and tricyclic carboxylates into layered double hydroxides, Journal of Solid State Chemistry, vol. 183, No. 12, Sep. 30, 2010, pp. 2877-2885, USA.

Kim et al., "Assembly of Metal-Organic Frameworks from Large Organic and Inorganic Secondary Building Units: New Examples and Simplifying Principles for Complex Structures", J. Am. Chem. Soc., 2001, 123, 8239-8247.

Krishnamoorthy et al., "Catalytic Oxidation of 1,2-Dichlorobenzene Over Supported Transition Metal Oxides", Journal of Catalysis, 2000, 193, 264-272, Academic Press.

Kumar et al., "Effect of MgO Nanoparticles on Ionic Conductivity and Electrochemical Properties of Nanocomposite Polymer Electrolyte", Journal of Membrane Science, 2007, 300, 104-110, Elsevier B.V.

Kumbhar, et al., Reduction of Aromatic Nitro Compounds with Hydrazine Hydrate in the Presence of the Iron(III) Oxide-MgO Catalyst Prepared from a Mg—Fe Hydrotalcite Prescursor, Tetrahedron Letters, 1998, vol. 39, 2573-2574, Elsevier Science Ltd.

Kumbhar, et al., Mg—Fe Hydrotalcite as a Catalyst for the Reduction of Aromatic Nitro Compounds with Hydrazine Hydrate, Journal of Catalysis, 2000, vol. 191, 467-473, Academic Press.

Lebaron et al., "Polymer-Layered Silicate Nanocomposites: An Overview", Applied Clay Science, 1999, 15, 11-29, Elsevier Science B.V.

Li et al., "Electroreduction of Carbon Monoxide to Liquid Fuel on Oxide-Derived Nanocrystalline Copper", Nature, 2014, 508, 504-507, MacMilan Publishers.

Li et al., "Mg(OH)2@reduced Graphene Oxide Composite for Removal of Dyes From Water", Journal of Materials Chemistry, 2011, 21, 13765-13768, The Royal Society of Chemistry.

Li et al., "Positively Charged Nanosheets Derived via Total Delamination of Layered Double Hydroxides", Chem. Mater., 2005, 17, 4386-4391, American Chemical Society.

Li et al., "Preparation of Nanocomposites of Metals, Metal Oxides, and Carbon Nanotubes via Self-Assembly", J. Am. Chem. Soc., 2007, 129, 9401-9409, American Chemical Society.

Li et al., "Stable Platinum Nanoparticles on Specific MgAl2O4 Spinal Facets at High Temperatures in Oxidizing Atmospheres", Nature Communications, 2013, DOI: 10.1038/ncomms3481, MacMilan Publishers Limited.

Lima, et al., "Characterization of basic catalysts by the use of nitromethane as NMR probe molecule and reactant", Journal of Cataly, Academic Press, vol. 223, No. 1, Feb. 20, 2004, pp. 28-35, USA.

Liu et al., "Gold-Catalyzed Direct Hydrogenative Coupling of Nitroarenes to Synthesize Aromatic Azo Compounds", Angew. Chem., 2014, 126, 7754-7758, Wiley-VCH Verlag GmbH & Co.

Liu et al., "Layered Double Hydroxide Nano- and Microstructures Grown Directly on Metal Substrates and Their Calcined Products for Application as Li-Ion Battery Electrodes", Advanced Functional Materials, 2008, 18, 1448-1458, Wiley-VCH Verlag GmbH & Co.

Liu et al., "Selective and Controlled Synthesis of a- and b- Cobalt Hydroxides in Highly Developed Hexagonal Platelets", J. Am. Chem. Soc., 2005, 127, 13869-13874, American Chemical Society.

Lu et al., "Sheet-like and Fusiform CuO Nanostructures Grown on Graphene by Rapid Microwave Heating for High Li-Ion Storage Capacities", J. Mater. Chem., 2011, 21, 17916.

Ma et al., "Metal-Organic Framework Derived Hybrd Co3O4-Carbon Porous Nanowire Arrays as Reversible Oxygen Evolution Electrodes", J. Am. Chem. Soc., 2014, 136, 13925-13931, American Chemical Society.

Makhluf et al., "Microwave-Assisted Synthesis of Nanocrystalline MgO and Its Use as a Bacteriocide", Adv. Funct. Mater., 2005, 15, 1708-1715, Wiley-VCH Verlag GmbH.

Meyn et al., "Anion-Exchange Reactions of Layered Double Hydroxides" Inorg. Chem. 1990, vol. 29, 5201-5207, American Chemical Society.

Mishra et al., "Effect of Nano-Mg(OH)2 on the Mechanical and Flame-Retarding Properties of Polypropylene Composites", Journal of Applied Polymer Science, 2004, 94, 116-122, Wiley Periodicals, Inc.

Miyata, Shigeo, "Physico-Chemical Properties of Synthetic Hydrotalcites in Relation to Composition", Clays and Clay Minerals, 1980, vol. 28, No. 1, 50-56, The Clay Minerals Society.

Moorhead-Rosenberg et al., "A Rapid Microwave-Assisted Solvothermal Approach to Lower-Valent Transition Metal Oxides", Inorg. Chem., 2013, 52, 13087-13093, American Chemical Society.

Mulukutla, C. Detellier, "Thermally activated Mg, Fe-layered double hydroxide as reductant for nitric oxide", Journal of Materials Science Letters 1996, vol. 15, 797-799, Chapman & Hall.

Nethravathi et al., "Synthesis and Anion-Exchange Reactions of a New Anionic Clay a-Magnesium Hydroxide", Journal of Colloid and Interface Science, 2011, 354, 793-797, Elsevier Inc.

Nethrvathi, et al., Cobalt Hydroxide/Oxide Hexagonal Ring-Graphene Hybrids through Chemical Etching of Metal Hydroxide Platelets by Graphene Oxide: Energy Storage Applications, ASCNano, 2014, vol. 8, No. 3, 2755-2765, American Chemical Society.

Newman et al., "Comparative Study of Some Layered Hydroxide Salts Containing Exchangeable Interlayer Anions", Journal of Solid State Chemistry, 1999, 148, 26-40, Academic Press.

Nielsen et al., "Delamination, Synthesis, Crystal Structure and Thermal Properties of the Layered Metal-Organic Compound Zn(C12H14O4)", J. Mater. Chem., 2008, 18, 1002-1007, The Royal Society of Chemistry.

Ning et al., "Gas-Hydrate Formation, Agglomeration and Inhibition in Oil-Based Drilling Fluids for Deep-Water Drilling", Journal of Natural Gas Chemistry, 2010, 19, 234-240, Elsevier.

Oswald et al., "Bivalent Metal Hydroxides", Preparation and Crystal Growth of Materials with Layered Structures, 1977, 71-140.

Park et al., "Synthesis and Characterization of Al(OH)3/Polystyrene Nanocomposite Latex Particles by Emulsion Polymerization", Macromol Symp., 2007, 247-250.

Pham et al., "A Silica-Supported Iron Oxide Catalyst Capable of Activating Hydrogen Peroxide at Neutral pH Values", Environ. Sci. Technol., 2009, 43, 8930-8935, American Chemical Society.

Poizot et al., Nano-sized transition-metal oxides as negative-electrode materials for lithium-ion batteries, Nature, 2000, vol. 407, pp. 496-499, Macmillan Magazines Ltd.

Prasanna, et al., Chromate uptake characteristics of pristine layered double hydroxides of Mg with Al, Solid State Sciences, 2008, vol. 10, 260-266, Elsevier Masson SAS.

Pupovac et al., "Cu/MgAl2O4 as Bifunctional Catalyst for Aldol Condensation of 5-Hydroxymethylfurfural and Selective Transfer Hydrogenation", ChemSusChem, 2013, 6, 2103-2110.

Qian et al., "Micropore Modification of Zeolites with Transition-Metal Oxides", Colloids and Surfaces A: Physiochemical and Engineering Aspects, 2001, 180, 311-316, Elsevier Science B.V.

Rajamathi et al., "The Many Ways of Making Anionic Clays", Proc. Indian Acad. Sci. (Chem. Sci.), 2001, 5 & 6, 671-680, Indian Academy of Sciences.

Ramirez, A.P., "Colassal Magnetoresistance", J. Phys.: Condens. Matter, 1997, 9, 8171-8199, IOP Publishing Ltd.

Rao et al., "Synthesis of Complex Metal Oxides by Novel Routes", Acc. Chem. Res., 1987, 20, 228-235, American Chemical Society.

Rao, C.N.R., "Transition Metal Oxides", Annu. Rev. Phys. Chem., 1989, 40, 291-326, Annual Reviews Inc.

Raveau, B., "Transition Metal Oxides: Promising Functional Materials", Journal of the European Ceramic Society, 2005, 25, 1965-1969, Elsevier Ltd.

Reddy et al., "Metal Oxides and Oxysalts as Anode Materials for Li Ion Batteries", Chem. Rev. 2013, 113, 5364-5457, American Chemical Society.

Stein et al., "Salt-Gel Synthesis of Porous Transition-Metal Oxides", Chem. Mater., 1995, 7, 304-313, American Chemical Society.

Reichle, Walter T., "Catalytic Reactions by Thermally Activated Anionic Clay Minerals" Journal of Catalysis, 1985, vol. 94, 547-557, Academic Press, Inc.

Sabbar, et al., "Probing the interaction between di- and tri-functionalized carboxy-phosphonic acid and LDH layer structure",

(56) References Cited

OTHER PUBLICATIONS

Journal of Physics and Chemistry of Solids, Pergamon Press, vol. 67, No. 11, Sep. 6, 2006, pp. 2419-2429, London, England.

Schwertfeger et al., "Diamonds are a Chemist's Best Friend: Diamondoid Chemistry Beyond Adamantane", Angew. Chem. Int. Ed., 2008, 47, 1022-1036, Wiley-VCH GmbH & Co.

Schwertmann et al., "The Formation of Green Rust and Its Transformation to Lepidocrocite", Clay Minerals, 1994, 29, 87-92, The Mineralogical Society.

Shukla, et al., "Stabilized a-Ni(OH)2 as Electrode Material for Alkaline Secondary Cells", J. Electrochem Soc., 1994, vol. 141, No. 11, 2956-2959, The Electrochemical Society, Inc.

Singoredjo et al., "Alumina Supported Manganese Oxides for the Low-Temperature Selective Catalytic Reduction of Nitric Oxide with Ammonia", Applied Catalysis B: Environmental, 1992, 1, 297-316, Elsevier Science Publishers B.V.

Spaldin et al., "The Renaissance of Magnetoelectric Multiferroics", Science, 2005, 309, 391-392, AAAS.

Spyrou et al., "Towards Novel Multifunctional Pillared Nanostructures: Effective Intercalation of Adamantylamine in Graphene Oxide and Smectite Clays", Adv. Fund. Mater., 2014, 24, 2841-5850, Wiley-VCH Verlag GmbH & Co.

Stankic et al., "Size-Dependent Optical Properties of MgO Nanocubes", Angew. Chem. Int. Ed., 2005, 44, 1917-4920, Wiley-VCH Verlag GmbH & Co.

Tao et al., "A redox-stable efficient anode for solid-oxide fuel cells" Nature Materials, 2003, vol. 2, 320-323, Nature Publishing Group.

Tao et al., "Synthesis and Characterization of Layered Double Hydroxides with a High Aspect Ratio", Journal of Solid State Chemistry, 2005, 179, 708-715, Elsevier Inc.

Tian et al., "Manganese Oxide Mesoporous Structures: Mixed-Valent Semiconducting Catalysts", Science, 1997, 276, 926-930.

Tokura et al., "Orbital Physics in Transition-Metal Oxides", Science, 2000, 288, 462-468.

U. Costantino, et al., Preparation and characterization of hydrotalcite/carboxyadamantan intercalation compounds as fillers of polymeric nanocomposites, Journal of Materials Chemistry, vol. 17, No. 11, Dec. 22, 2006, pp. 1079-1086.

Mdal-Michel et al., "Effect of Crystal Size on the Oxidative Dehydrogenation of Butane on V/MgO Catalysts", Journal of Catalysis, 2004, 221, 127-136, Elsevier Inc.

Walia et al., "Transition Metal Oxides—Thermoelectric Properties", Progress in Materials Science, 2013, 58, 1443-1489, Elsevier Ltd.

Wang et al., "CO2 Capture by Solid Adsorbents and Their Applications: Current Status and New Trends", Energy Environ Sci., 2011, 4, 42-55, The Royal Society of Chemistry.

Wang et al., "Electronics and Optoelectronics of Two-Dimensional Transition Metal Dichalcogenides", Nature Nanotechnology, 2012, 7, 699-712, Macmilan Publishers.

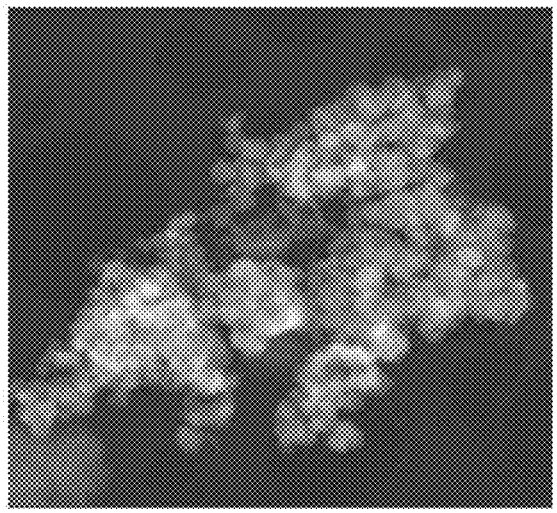 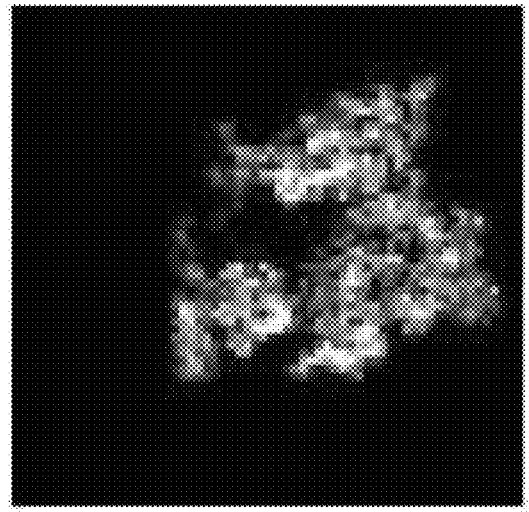
FIG. 15A   FIG. 15B
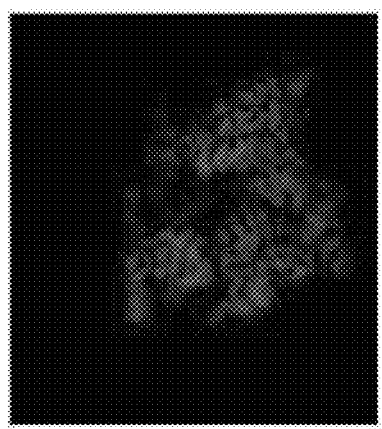 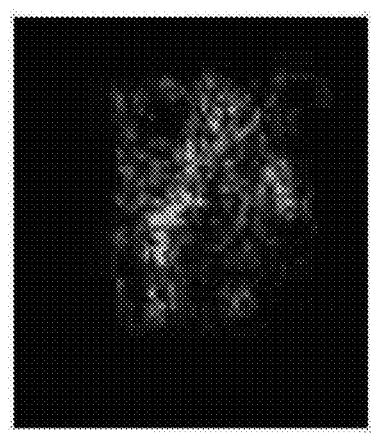 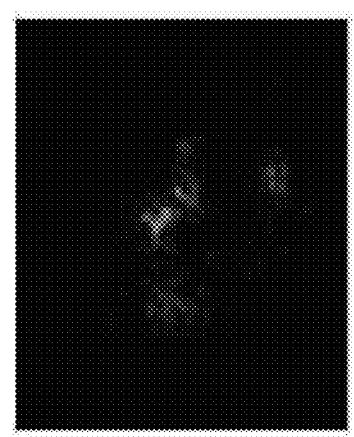
FIG. 15C   FIG. 15D   FIG. 15E

METHODS FOR PREPARING MIXED-METAL OXIDE DIAMONDOID NANOCOMPOSITES AND CATALYTIC SYSTEMS INCLUDING THE NANOCOMPOSITES

CROSS-REFERENCE TO RELATED APPLICATIONS

This application claims priority to U.S. Non-Provisional patent application Ser. No. 15/966,312 filed Apr. 30, 2018 which claims priority to U.S. Provisional Patent Application Ser. No. 62/508,672 filed May 19, 2017, which are incorporated by reference herein in their entirety.

TECHNICAL FIELD

The present specification generally relates to preparation of nanocomposites and to catalytic systems including the nanocomposites and, more specifically, to synthesis of mixed metal-oxide diamondoid nanocomposites and catalytic systems containing the nanocomposites.

BACKGROUND

Catalyst materials may be produced from anionic clays such as layered double hydroxides (LDHs). Anionic clays are inverse charge analogs of the widely used aluminosilicate cationic clays in their structure and properties. The largest group of the LDH family of materials includes positively charged metal hydroxide layers having the composition $[M^{II}_{1-x}M^{III}_{x}(OH)_2]^{x+}$ ($M^{II}$=Mg, Ca, Co, Ni, Zn; $M^{III}$=Al, Cr, Fe; $0.2 \leq x \leq 0.33$). The positive charges on the hydroxide layers are balanced by anions between the layers. The anions give rise to the name anionic clays. One group of anionic clays includes materials having a general formula $[M^{II}_{1-x}M^{III}_{x}(OH)_2](A^{n-})_{x/n} \cdot mH_2O$ (m=0.33-0.50), where A is an anion such as nitrate or halogen.

LDHs are environmentally benign and economically viable layered materials. Owing to their readily varied composition, well-dispersed substitutions, and layered morphology, these materials have found use in various applications. Thermal decomposition of LDHs results in mixed-metal oxides that are chemically basic. These mixed-metal oxides have potential for use as heterogeneous catalysts in various catalyzed reactions, including the water gas shift reaction and photocatalytic applications. In addition, these mixed-metal oxides may be suitable for capturing $CO_2$ from coal fired power plants that emit large amounts of $CO_2$ into the environment. In one or more applications, mixed-metal oxide materials obtained from LDHs have been found to be suitable sorbents for capturing acidic $CO_2$ gas and to be capable of adsorbing toxic ions from industrial effluents and drinking water.

The synthesis of supported metal or metal-oxide catalysts is important to the field of industrial heterogeneous catalysts. High activity, high selectivity, and long catalyst life are desirable characteristics of any industrial catalyst.

SUMMARY

Ongoing needs exist for methods to synthesize active and selective catalysts that are also environmentally friendly. Accordingly, embodiments of this disclosure include methods for synthesizing nanocomposites including metal oxide particles obtained by decomposing LDHs. In particular, the synthesis methods may be conducted as a "one pot" synthesis, without a need for multiple washing steps. Nanocomposites prepared according to the methods may be incorporated into catalytic systems.

According to some embodiments, a method for preparing a layered metal nanocomposite includes mixing a magnesium salt and an aluminum salt to form a $Mg^{2+}/Al^{3+}$ solution. The $Mg^{2+}/Al^{3+}$ solution has a molar ratio of Mg:Al of between 0.5:1 to 6:1. Subsequently, a diamondoid compound is added to the $Mg^{2+}/Al^{3+}$ solution to form a reactant mixture. The diamondoid compound has at least one carboxylic acid moiety. The reactant mixture is heated at a reaction temperature for a reaction time to form a Mg/Al-diamondoid intercalated layered double hydroxide. The Mg/Al-diamondoid intercalated layered double hydroxide is thermally decomposed under a reducing atmosphere for a decomposition time at a decomposition temperature to form the layered metal nanocomposite.

Some embodiments include layered metal nanocomposites prepared according to the method of this disclosure. The layered metal nanocomposites include magnesium oxide (MgO) comprising 50 wt. % to 90 wt. % of the nanocomposite based on the total weight of the nanocomposite. The MgO may include particle sizes of from 10 nanometers (nm) to 20 nm.

BRIEF DESCRIPTION OF FIGURES

FIG. 15A is an STEM micrograph of a nanocomposite formed from Mg/Al-adamantane intercalated LDH and decomposed at 450° C. in a hydrogen atmosphere in accordance with one or more embodiments of the present disclosure.

FIG. 15B is an elemental mapping of magnesium in the STEM micrograph of FIG. 15A.

FIG. 15C is an elemental mapping of oxygen in the STEM micrograph of FIG. 15A.

FIG. 15D is an elemental mapping of carbon in the STEM micrograph of FIG. 15A.

FIG. 15E is an elemental mapping of aluminum in the STEM micrograph of FIG. 15A.

DETAILED DESCRIPTION

Figure 1:
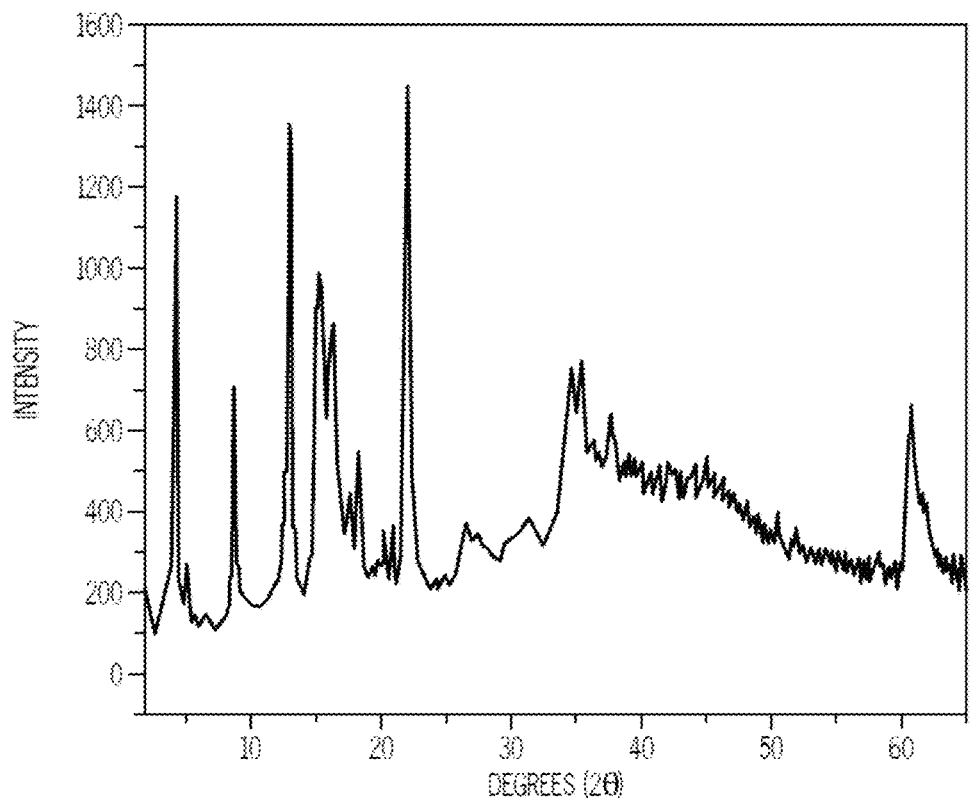
FIG. 1 is a Powder X-Ray Diffraction (PXRD) pattern of a Mg/Al-adamantoate LDH according to one embodiment.

Abbreviations appearing in this disclosure are defined as follows: ° C.=Degrees Celsius; Å=Angstroms; ACA=1-adamantane carboxylic acid; AD=adamantane; cm=centimeter ($10^{-2}$ meter); EDX=Energy-Dispersive X-Ray; FWHM=full width at half maximum; h=hours; HRTEM=High-Resolution Transmission Electron Microscopy; IR=Infrared; LDH=layered double hydroxide; µm=micrometer ($10^{-6}$ meter); mL=milliliter ($10^{-3}$ liter); nm=nanometer ($10^{-9}$ meter); ppm=parts per million; PXRD=Powder X-Ray Diffraction; SEM=Scanning Electron Microscopy; TEM=Transmission Electron Microscopy; TGA=Thermogravimetric Analysis; TMO=Transition metal oxide; and wt. %=Weight percent.

The dispersion of active reduced-metal or metal-oxide particles on a stable support is a complex and labor-intensive process requiring consideration of multiple parameters such as synthesis conditions, properties of the support, and appropriate methods for dispersing or distributing active catalyst on the support. Among metal/metal oxide supported catalysts, Cu/ZnO/$Al_2O_3$ systems and metal/metal oxide (Pt, Pd, Rh and Au) systems supported on various supports (alumina, silica, and carbon) can catalyze industrial-scale reactions such as synthesis of methanol, water gas shift reaction, desulfurization of petrochemical streams, photochemical or electrochemical splitting of water, and photochemical or electrochemical reduction of carbon dioxide into useful chemicals, for example.

Reference will now be made in detail to embodiments of adamantane-intercalated layered double hydroxide (LDH) particles with high aspect ratios and the methods of producing them. Specifically, the adamantane-intercalated LDH particles have aspect ratios greater than 100. The aspect ratio is defined by the width of the LDH particle divided by the thickness of the LDH particle. As used in this disclosure, the term "low aspect ratio" refers to an aspect ratio less than 10; a "medium aspect ratio" is an aspect ratio from 10 to 100; and a "high aspect ratio" is an aspect ratio greater than 100. Aspect ratios of individual LDH particles may be calculated from micrographs such as SEM images.

Methods for preparing diamondoid-intercalated LDH particles, specifically adamantane-intercalated LDH particles, are described in commonly assigned United States Application Publication Number 2017/0267623, published Sep. 21, 2017, claiming the benefit of U.S. Provisional Application Ser. No. 62/309,645, filed Mar. 17, 2016, both incorporated by reference into this disclosure in their entirety. United States Application Publication Number 2017/0267623 describes methods for preparing diamondoid-intercalated mixed-metal LDH. These diamondoid-intercalated mixed-metal LDH were decomposed to nanocomposites under air. The presence of oxygen alters the decomposition process and the resulting nanocomposite is structurally and chemically different from a nanocomposite formed by decomposing a diamondoid-intercalated mixed-metal LDH in a reducing atmosphere.

As used in this specification, the term "diamondoid" refers to variants of carbon cage molecules known as adamantane ($C_{10}H_{16}$). The carbon cages include tri-, tetra-, penta, and polycyclic structures. In some embodiments, diamondoid includes adamantane, diamantane, triamantane and higher polymantanes. The diamondoid compounds may include a functional group such as carboxylic acid, hydroxyl, carboxylic ester, or amine. In some embodiments, the diamondoid compound is 1-adamantane carboxylic acid.

The methods for preparing a layered metal nanocomposite include mixing a magnesium salt and an aluminum salt to form a $Mg^{2+}/Al^{3+}$ solution, in which the molar ratio of magnesium to aluminum is from 1:1 to 6:1. A diamondoid compound is added to the $Mg^{2+}/Al^{3+}$ solution to form a reactant mixture. The diamondoid compound has at least one carboxylic acid moiety. The reaction mixture then is thermally treated at a reaction temperature for a reaction time to form a diamondoid-intercalated Mg/Al LDH. The diamondoid-intercalated Mg/Al LDH is thermally treated in a reducing atmosphere for a decomposition time at a decomposition temperature. The thermal treatment in the reducing atmosphere decomposes the diamondoid-intercalated Mg/Al LDH to form the layered metal nanocomposite.

In some embodiments, the $Mg^{2+}/Al^{3+}$ solution is an aqueous solution. An aqueous solution can be any suitable fluid such as water or a solution containing both water and one or more organic or inorganic compounds dissolved in the water or otherwise completely miscible with the water.

In one or more embodiments, the magnesium salt of the $Mg^{2+}/Al^{3+}$ solution may include any magnesium compound containing $Mg^{2+}$ and a counter anion. Non-limiting examples of magnesium salts, therefore, include $Mg(OH)_2$, $MgCl_2$, $MgBr_2$, $Mg(NO_3)_2$, and $MgSO_4$. In some embodiments, the magnesium salt may be $Mg(OH)_2$. MgO formed from the calcination of $Mg(OH)_2$ is of particular interest for its activity as a solid base catalyst.

In some embodiments, the aluminum salt in the $Mg^{2+}$/$Al^{3+}$ solution may include any aluminum compound containing $Al^{3+}$ and a counter anion. Non-limiting examples of aluminum salts include any soluble aluminum salt, such as $Al(OH)_3$, $AlCl_3$, $AlBr_3$, $AlCl_3$, $Al_2(SO_4)_3$, $Al(NO_3)_3$, and $AlPO_3$. $Al_2O_3$ formed from the calcination of $Al(OH)_3$ is of particular interest for its activity as a solid base catalyst.

In the reactant mixture, the diamondoid compound has at least one carboxylic acid moiety. In some embodiments, the diamondoid compound may be chosen from carboxylic acids of adamantane, diamantane, or triamantane. In some embodiments, the diamondoid compound may be 1-adamantanecarboxylic acid (ACA).

In some embodiments of methods for preparing a layered metal nanocomposite, the reaction mixture may be prepared by mixing a magnesium salt such as, for example, $Mg(OH)_2$, and the aluminum salt such as $Al(OH)_3$ in amounts that provide a molar ratio of $Mg^{2+}$ to $Al^{3+}$ in the reaction mixture of from 0.5:1 to 6:1. For example, the $Mg^{2+}/Al^{3+}$ solution may have a $Mg^{2+}/Al^{3+}$ molar ratio of 1:1, 2:1, 3:1, 4:1, 5:1, or 6:1. The $Mg^{2+}/Al^{3+}$ solution may have a total solids content of less than 15 wt. % based on a total weight of the $Mg^{2+}/Al^{3+}$ solution. The total solids content may include any solid compound added to the $Mg^{2+}/Al^{3+}$ solution. Specific examples of solid compounds added to the $Mg^{2+}/Al^{3+}$ solution that are counted as part of the total solids content include, but are not limited to, the magnesium salt, the aluminum salt, and the diamondoid compound. In some embodiments, the total solids content is limited to include the magnesium salt, aluminum salt, and the diamondoid compound. In some embodiments, the total solid content of the $Mg^{2+}/Al^{3+}$ solution is from 0.1 wt. % to 15 wt. %, 0.5 wt. % to 10 wt. %, or is less than 5 wt. %.

In one or more embodiments, the methods for preparing a layered metal nanocomposite may include adding an amount of diamondoid compound to the $Mg^{2+}/Al^{3+}$ solution to form a reaction mixture having an Al to diamondoid compound molar ratio of from 0.5:1 to 2:1. In some embodiments, the Al to diamondoid compound molar ratio in the reaction mixture may be from 0.8:1.0 to 1.2:1.0. For example, the molar ratio of Al to the diamondoid compound may be 1:1.

The specific molar ratio of $Mg^{2+}$ to $Al^{3+}$ and $Al^{3+}$ to diamondoid compound in the reaction mixture may be chosen to tailor overall crystal morphology of the diamondoid-intercalated Mg/Al LDH. Without intent to be bound by theory, it is believed that the crystal morphology of the diamondoid-intercalated Mg/Al LDH may be tailored by increasing or decreasing the ratio of $Al^{3+}$ to ACA in the reaction mixture. Though in some embodiments the ratio of $Al^{3+}$ to diamondoid compound may be selected from 0.5:1 to 1.0:1, it should be understood that the crystal morphology of the diamondoid-intercalated Mg/Al LDH may be further tailored by decreasing the ratio of $Mg^{2+}$ to diamondoid compound to less than 0.5:1 or by increasing the ratio of $Mg^{2+}$ to diamondoid compound to greater than 1.0:1. Even so, a point of magnesium saturation is believed to exist, such that at a ratio of $Mg^{2+}$ to diamondoid compound greater than the saturation point of additional magnesium ions cannot be incorporated into the diamondoid-intercalated Mg/Al LDH.

The reaction temperature is chosen to provide sufficient thermodynamic energy for the reaction of the magnesium salt and the diamondoid compound to proceed within the reaction vessel and also to enable crystallization of the Mg/Al-diamondoid-intercalated LDH. The reaction temperature should be sufficiently high to enable the reaction to progress but also be sufficiently low to avoid decomposition of the Mg/Al-diamondoid-intercalated LDH or solvation of crystallites. In some embodiments, the reaction temperature may be from 100° C. to 200° C., such as 100° C., 110° C., 120° C., 130° C., 140° C., 150° C., 160° C., 170° C., 180° C., 190° C., 200° C., or any other temperature between 100° C. and 200° C. Though in some embodiments the reaction temperature may be from 100° C. to 200° C., the reaction temperature could be less than 100° C. or greater than 200° C. In other embodiments, the reaction temperature may be from 100° C. to 150° C. or from 110° C. to 150° C. In one example, where magnesium salt is $Mg(OH)_2$, the reaction temperature may be 150° C. 10° C.

The reaction time is chosen to provide sufficient time for crystal growth and for development of well-defined morphologies as the Mg/Al-diamondoid-intercalated LDH is formed at the reaction temperature. In some embodiments, the reaction time may be longer than 12 h, such as from 12 h to 72 h, from 24 h to 72 h, from 12 h to 48 h, or from 24 h to 48 h, for example. Though in some embodiments the reaction time may be longer than 12 h, it is contemplated that reaction times shorter than 12 h may suffice, particularly when reaction temperatures greater than 150° C. are chosen.

Complete decomposition of the diamondoid-intercalated Mg/Al LDH may include conversion of magnesium-hydroxide and aluminum-hydroxide functionalities to magnesium oxide and aluminum particles. Suitable decomposition temperatures may be greater than 200° C., greater than 300° C., greater than 400° C., or greater than 500° C., for example. The decomposition time may be chosen as any time sufficient to result in complete decomposition of the Mg/Al-diamondoid-intercalated LDH at the chosen decomposition temperature. For example, the decomposition time may be longer than 1 hour, such as 2 hours, 3 hours, 4 hours, or longer than 5 hours. In example embodiments, Mg/Al-diamondoid-intercalated LDHs formed from $Mg(OH)_2$, $Al_2(OH)_3$, and ACA may decompose fully at a decomposition temperature of about 450° C. and a decomposition time of at least 4 hours.

Nanocomposites formed by thermally decomposing the Mg/Al-diamondoid-intercalated LDH may exhibit a variety of crystal morphologies. The crystal morphologies may depend on variables, such as the ratio of $Mg^{2+}$ to $Al^{3+}$ and the ratio of $Al^{3+}$ to diamondoid compound in the reaction mixture, the reaction time and temperature used to form the Mg/Al-diamondoid-intercalated LDH, and the decomposition conditions used to form the nanocomposite itself.

In some embodiments, the methods for preparing the layered metal nanocomposites include thermally decomposing Mg/Al-diamondoid-intercalated LDHs prepared by reacting $Mg(OH)_2$, $Al(OH)_3$, and ACA. In other embodiments, the method for preparing layered metal nanocomposites includes thermally decomposing Mg/Al-diamondoid-intercalated LDHs.

Nanocomposites formed from such Mg/Al-diamondoid-intercalated LDHs may include magnesium oxide particles (MgO) of a particular shape or morphology dispersed on a carbon support of a particular shape or morphology. The metal-oxide particle may be spherical, rectangular, ribbon-like, or in the form of nanowires, nanorods, or nanowhiskers, for example. The magnesium oxide particles may have particle sizes from 10 nm to 20 nm, for example. Likewise, the carbon support may exhibit a morphology such as a sheet, a nanorod, a nanowire, or a nanowhisker.

The term "nanorod" means a nanoobject with two dimensions ranging from 1 to 100 nm and the third dimension (length) being slightly greater. The term "nanowire" means a conducting anisotropic quasi-one-dimensional structure in which two external dimensions (such as width and thickness) are much smaller than the third dimension (length) are in the nanoscale. The term "nanowhisker" means a type of filamentary crystal (whisker) with cross sectional diameter ranging from 1 to 100 nm and length to diameter ratio greater than 100.

Without intent to be bound by theory, it is believed that upon thermal decomposition of LDHs, interlayer anions escape as volatile gases and further heating results in the collapse of the layered structure. The collapse of the layered structure leads to the formation of mixed metal oxides that are agglomerated (larger particle size). In the preparation of nanocomposites according to embodiments, the interlayer anions do not decompose, but rather polymerize to yield rod shaped adamantane molecules. This enables the formation of layer by layer assemblies of metal oxides and carbon nanocomposites from the molecular level. Thus, preparation methods according to one or more embodiments not only prevent particle agglomeration, but also provide the support for the metal oxides.

The thermal decomposition of LDHs may progress through three observable steps: (a) from room temperature to 100° C., adsorbed or physisorbed water is removed; (b) in the temperature range of 100-220° C. intercalated water is removed; (c) at 220-400° C., intercalated anions are removed and the mineral layers are dehydroxylated, leading to the formation of an amorphous mixed-metal oxide residue. Generally, intercalated anions completely decompose and escape as volatile gases before the temperature reaches 450° C. Once the LDH is decomposed and water and intercalated anions are removed, an amorphous residue of metal oxide is left behind. In some embodiments, the decomposition temperature is from 220° C. to 450° C. In other embodiments the decomposition temperature is from 300° C. to 450° C. In some embodiments, thermally decomposing the diamondoid-intercalated Mg/Al LDH includes heating the diamondoid-intercalated Mg/Al LDH to the decomposition temperature at a rate of 5° C. per minute.

The various embodiments described in this disclosure control decomposition of the diamondoid-intercalated Mg/Al LDH. In addition to the decomposition temperature and decomposition time, the atmospheric conditions control the decomposition of the diamondoid-intercalated Mg/Al LDH. When oxygen is not present during decomposition, the nanocomposite resulting from the decomposition is altered from that of a nanocomposite decomposed in air. In one or more embodiments, the methods for preparing the layered metal nanocomposites include thermally treating the diamondoid-intercalated Mg/Al LDH under a reducing atmosphere at a decomposition temperature for a decomposition time to form the layered metal nanocomposite.

In some embodiments, the thermal decomposition of the diamondoid-intercalated Mg/Al occurs under a reducing atmosphere. The reducing atmosphere for the thermal decomposition of the Mg/Al-diamondoid intercalated LDH prevents oxidation through a decrease in the amount of oxygen or other oxidizing gases or vapors in the vicinity of the reaction. The reducing atmosphere may contain actively reducing gases such as hydrogen, carbon monoxide, or gases such as hydrogen sulfide that would be oxidized by any oxygen present. In some embodiments, the reducing atmosphere includes hydrogen gas ($H_2$).

In some embodiments, the decomposition of the diamondoid-intercalated Mg/Al LDH results in formation of a nanocomposite, in which magnesium oxide particles may be uniformly dispersed over a surface of a carbon support. The carbon support may be derived from the adamantane moieties of the diamondoid-intercalated Mg/Al LDH. The weight ratios of MgO particles to carbon in the nanocomposite may vary, depending on the conditions by which the nanocomposite was prepared. In some embodiments, the nanocomposite may include from 50 wt. % to 90 wt. % MgO particles and from 10 wt. % to 50 wt. % adamantane-derived carbon, based on the total weight of the nanocomposite. For example, the nanocomposite may include from 70 wt. % to 80 wt. % MgO particles and from 20 wt. % to 30 wt. % adamantane-derived carbon, based on the total weight of the nanocomposite.

Further embodiments of this specification are directed to catalyst systems. The catalyst systems may include (a) a diamondoid-intercalated Mg/Al LDH prepared according to any embodiment previously described; (b) a nanocomposite such as magnesium oxide particles supported on carbon prepared according to any embodiment previously described, such as by thermal decomposition of a diamondoid-intercalated Mg/Al LDH; or (c) any catalytically active mixture of (a) and (b). The catalyst system may be used in olefin synthesis, transalkylation and dealkylation, photo or electocatalytic water splitting.

Accordingly, further embodiments of this specification are directed to methods for catalyzing a chemical reaction of at least one first reactant with at least one second reactant. Such methods may include reacting the at least one first reactant and the at least one second reactant in the presence of a catalyst system described previously. The at least one first reactant and the at least one second reactant may be any chemical compounds, the chemical reaction of which is catalytically facilitated, such as by being made thermodynamically possible or more favorable or being kinetically influenced, by the presence of the diamondoid-intercalated Mg/Al LDH or the MgO nanocomposite separately or in combination.

EXAMPLES

The embodiments described in this specification will be further clarified by the following Examples. It should be understood that the following Examples are not intended to limit the scope of this disclosure or its claims to any particular embodiment.

Example 1

Preparation of Diamondoid-Intercalated Mg/Al Layered Double Hydroxides

Method $A_1$: Mg/Al molar ratio of 2:1 To prepare an diamondoid-intercalated Mg/Al layered double hydroxide material according to an embodiment previously described, a 5% wt/wt solution of $Mg(OH)_2$ was prepared by dissolving 5 grams (g) of $Mg(OH)_2$ in 95 g of de-ionized water. To the resultant solution, 3.36 g of $Al(OH)_3$ was added in an amount sufficient to provide a Mg/Al molar ratio of 2:1. Then, 9.31 g of adamantane carboxylic acid was added to the solution in an amount sufficient to provide an Al/adamantane molar ratio of 1:1 in the resultant reaction mixture. The pH of the reaction mixture was measured and was found to be 9.5.

The reaction mixture then was stirred vigorously for 1 hour at room temperature. The stirred reaction mixture was transferred to a Teflon-lined autoclave and was heated at 150° C. for 24 hours (h) to form a diamondoid-intercalated Al/Mg LDH as a precipitant. The diamondoid-intercalated Al/Mg LDH was separated from the reaction mixture via gravity filtration. The pH of the filtrate was measured and was found to be 8.6. The precipitant was washed thoroughly with water until the filtrate had a pH of about 7. The precipitant was dried at 65° C.

Method $A_2$: Mg/Al molar ratio of 5:1 To prepare an diamondoid-intercalated Mg/Al layered double hydroxide material according to an embodiment previously described, a 5% wt/wt solution of $Mg(OH)_2$ was prepared by dissolving 5 grams (g) of $Mg(OH)_2$ in 95 g of de-ionized water. To the resultant solution, 1.34 g of $Al(OH)_3$ was added in an amount sufficient to provide a Mg/Al molar ratio of 5:1. Then, 2.34 g of adamantane carboxylic acid, the diamondoid compound, was added to the solution in an amount sufficient to provide an Al/adamantane molar ratio of 1:1 in the resultant reaction mixture. The pH of the reaction mixture was measured and was found to be 9.5.

The reaction mixture then was stirred vigorously for 1 hour at room temperature. The stirred reaction mixture was transferred to a Teflon-lined autoclave and was heated at 150° C. for 24 hours to form a diamondoid-intercalated Al/Mg LDH as a precipitant. The diamondoid-intercalated Al/Mg LDH was separated from the reaction mixture via gravity filtration. The pH of the filtrate was measured and was found to be 8.6. The precipitant was washed thoroughly with water until the filtrate had a pH of about 7. The precipitant was dried at 65° C.

The diamondoid-intercalated Mg/Al LDH resulting from the 2:1 molar ratio of Mg to Al (Method $A_1$) was characterized by IR spectroscopy, PXRD, EDX, proton and carbon solid state NMR.

Figure 2:
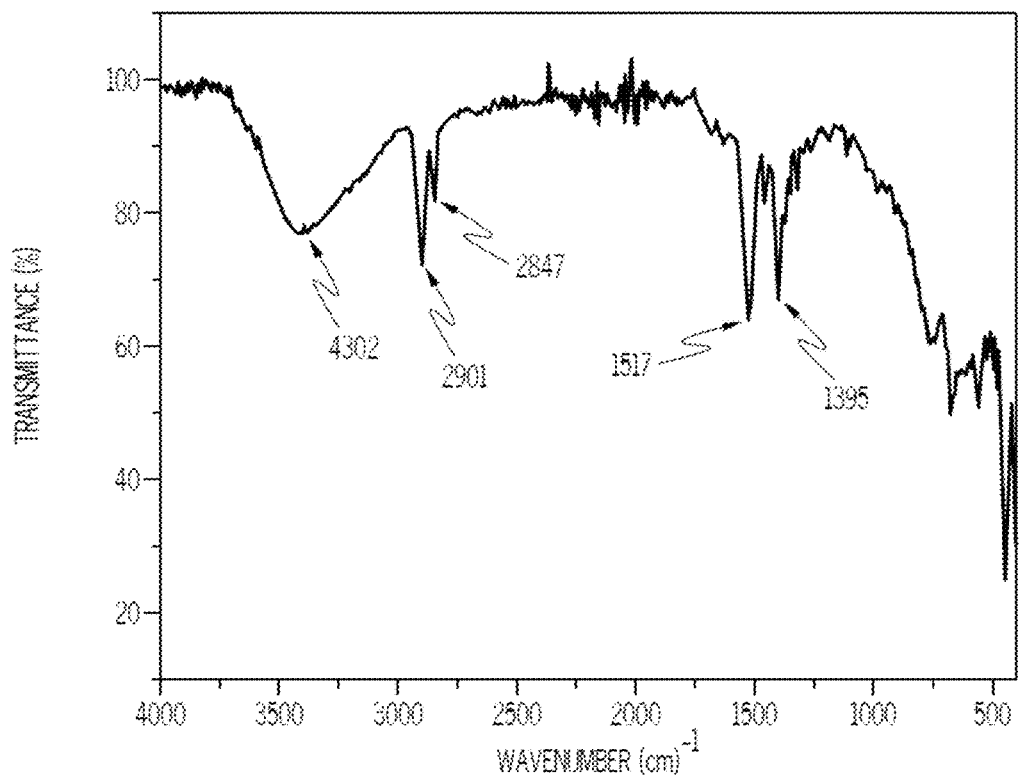
FIG. 2 is an Infrared (IR) transmittance spectrum of a Mg/Al-adamantoate LDH according to one embodiment.

The PXRD pattern of the as synthesized diamondoid-intercalated Mg/Al LDH is given in FIG. 1, and shows the basal reflection (001) at 20.84 Å corresponds to a bilayer arrangement of adamantane ions in the interlayer. The submultiples of (001) are seen at higher 2θ values. Intercalation of adamantoic acid was further characterized with IR spectra (FIG. 2). The vibrations at 1517 $cm^{-1}$ and 1395 $cm^{-1}$ correspond to anti-symmetric and symmetric stretching vibrations of the $COO^-$ group. The vibrations at 2901 $cm^{-1}$ and 2847 $cm^{-1}$ are for the C—H vibrations. The 4302 $cm^{-1}$ vibration arises from hydrogen bonding of diamondoid-intercalated Mg/Al LDH hydroxide groups with intercalated water molecules in the interlayer.

Figure 3:
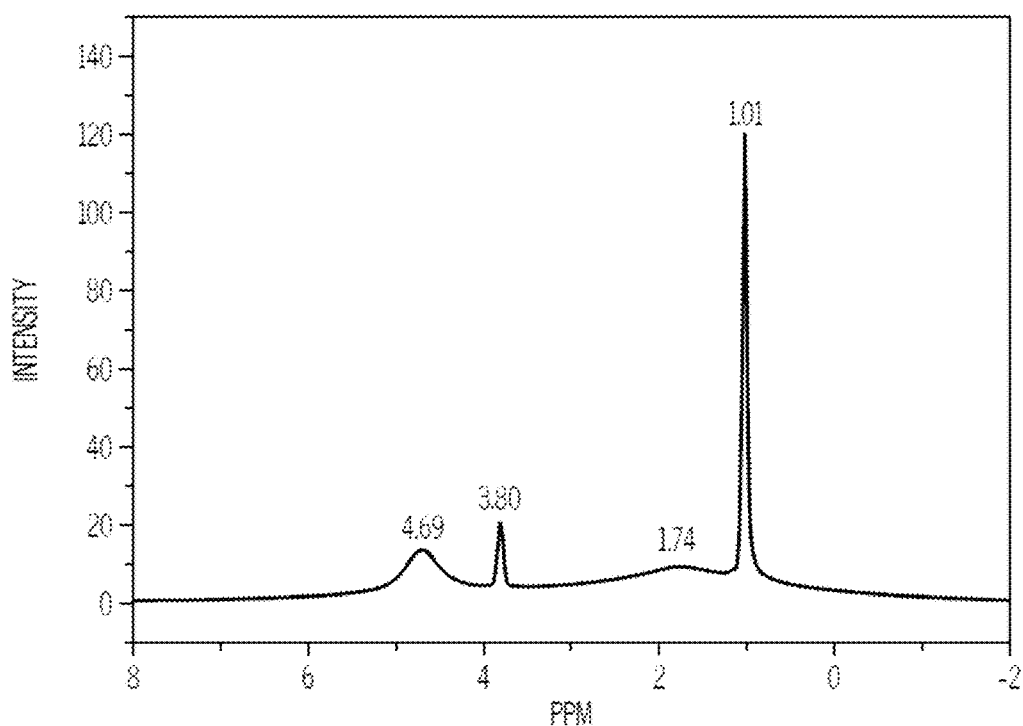
FIG. 3 is a proton solid-state Nuclear Magnetic Resonance (NMR) spectrum of a Mg/Al-adamantoate LDH according to one embodiment.
Figure 4:
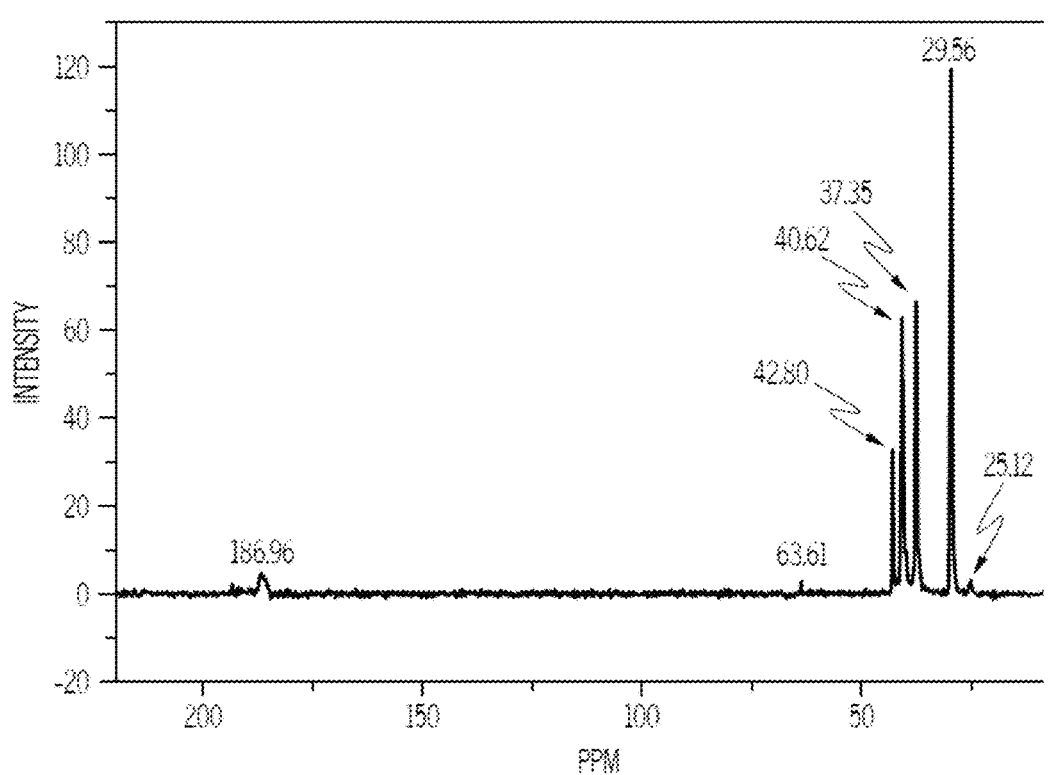
FIG. 4 is a carbon-13 ($^{13}C$) solid-state NMR spectrum of a Mg/Al-adamantoate LDH according to one embodiment.
Figure 5B:
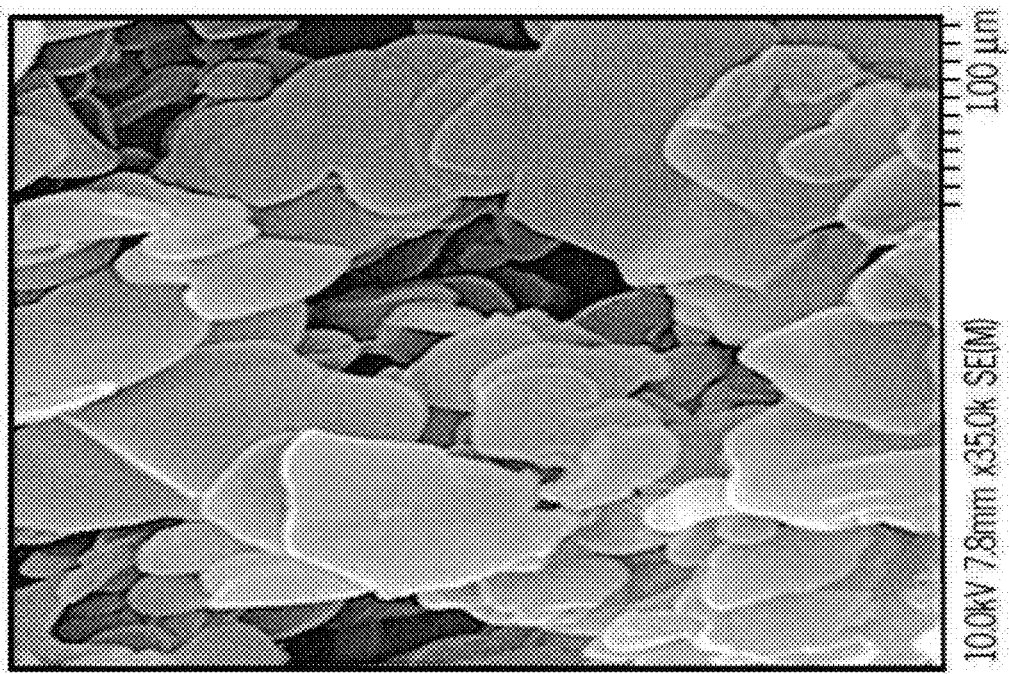
FIGS. 5A and 5B are Scanning Electron Microscopy (SEM) micrographs at different magnifications of an Mg/Al-adamantoate LDH prepared according to the present disclosure.
Figure 5A:
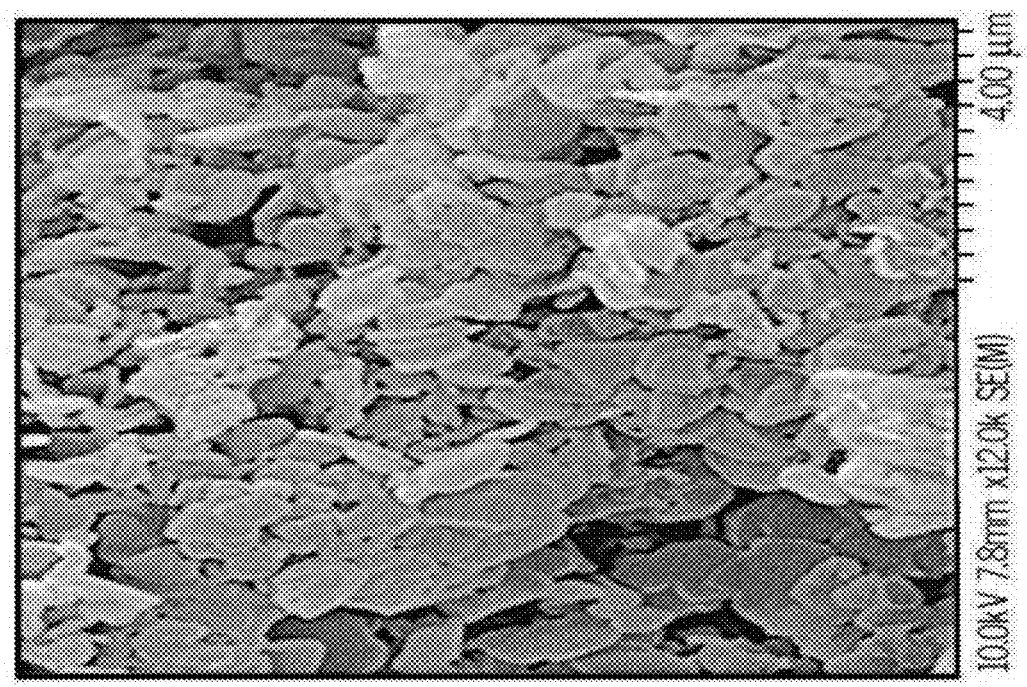

In FIG. 3, the $^1H$ spectrum of diamondoid-intercalated Mg/Al LDH showed four sharp signals at lower parts per million (ppm) values owing to the hydrogen atoms present in the adamantane ring. The peak at 3.8 ppm and 4.8 ppm are the result of hydrogen atoms of the intercalated water and metal hydroxide respectively. In FIG. 4, the $^{13}C$ NMR spectra of diamondoid-intercalated Mg/Al LDH showed four signals at 29.5 ppm, 37.3 ppm, 40.6 ppm and 42.8 ppm indicate that there are four different carbon environments present in the adamantane molecule. The signal at 186.98 ppm arises from the carbon of the carbonyl carbon of the carboxylate group in the adamantane molecule. FIGS. 5A-5B are SEM micrographs of Mg/Al-adamantoate LDH, and depict the structural shape of the diamondoid-intercalated Mg/Al LDH. For example, SEM micrographs show the layered particles have a large surface area, but lacked thickness, thereby resulting in a high aspect ratio.

Example 2

Preparation of Mixed-Metal Oxide Nanocomposite

Mixed-metal oxides were prepared by thermally decomposing the diamondoid-intercalated Mg/Al LDH having a Mg/Al molar ratio of 1:1 (Method $A_1$) of Example 1 at 450° C. for four hours under a reducing atmosphere of hydrogen gas. Upon thermal decomposition, LDHs yield mixed-metal oxides. The diamondoid-intercalated Mg/Al LDH, yielded MgO and $MgAl_2O_4$ oxides.

The mixed-metal oxide nanocomposite resulting from the diamondoid-intercalated Mg/Al LDH resulting from the 2:1 molar ratio of Mg to Al (Method $A_1$) was characterized by IR spectroscopy, PXRD, EDX, proton, carbon, and aluminum solid state NMR, SEM, TEM, and HRTEM.

Figure 6:
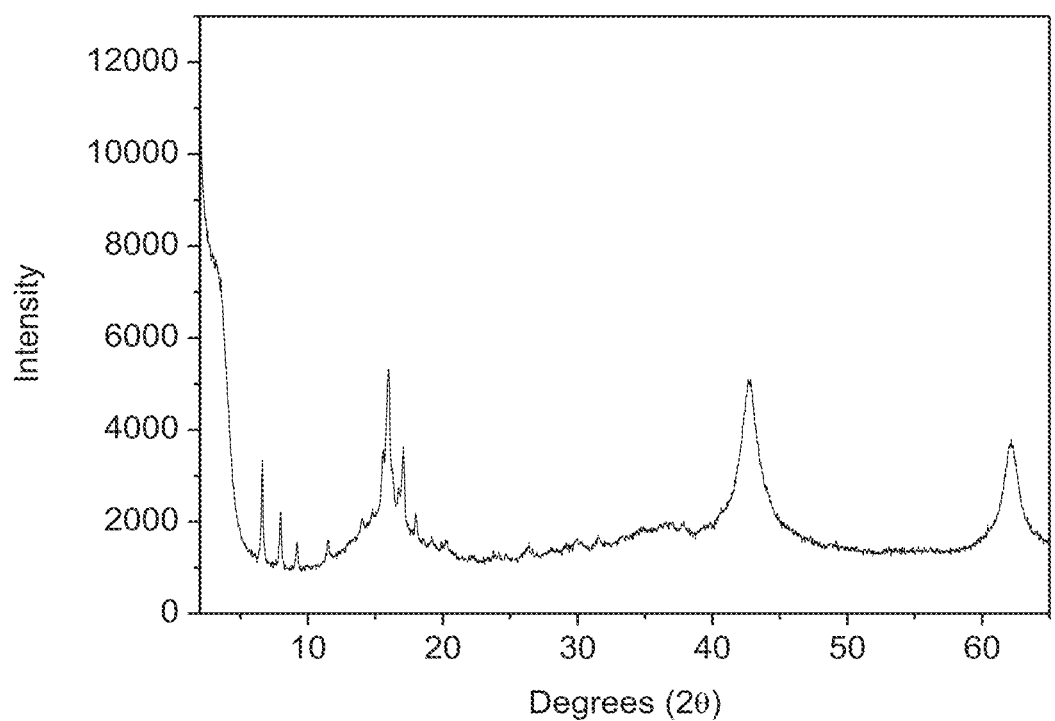
FIG. 6 is a PXRD pattern of a nanocomposite formed from Mg/Al-adamantane intercalated LDH and decomposed at 450° C. in a hydrogen atmosphere in accordance with one or more embodiments of the present disclosure.

The layered metal nanocomposite was analyzed by PXRD (FIG. 6). The resultant nanocomposite exhibited a series of basal reflections at 2θ angles and the corresponding to d-spaces, 6.61° (13.36 Å) 7.98° (11.07 Å), 9.23° (9.57 Å), 11.49° (7.7 Å), 14.0° (6.32 Å), 14.77° (6.0 Å), 16.02° (5.52 Å), 17.09° (5.18 Å), 18.04° (4.91 Å), 42.71° (2.11 Å), and 62.2° (1.29 Å). The reflections at 42.71° and 62.2° are typical of mixed-metal oxides obtained by thermal decomposition of LDHs and are assigned to the MgO phase of the oxide residue. The multiple reflections at lower 2θ values, specifically 6.61°, 7.98°, 9.23° and 11.49°, are unusual for mixed metal oxides of LDHs and in this case appear in the PXRD pattern as the result of the diamondoid compound in the resultant nanocomposite.

Figure 7:
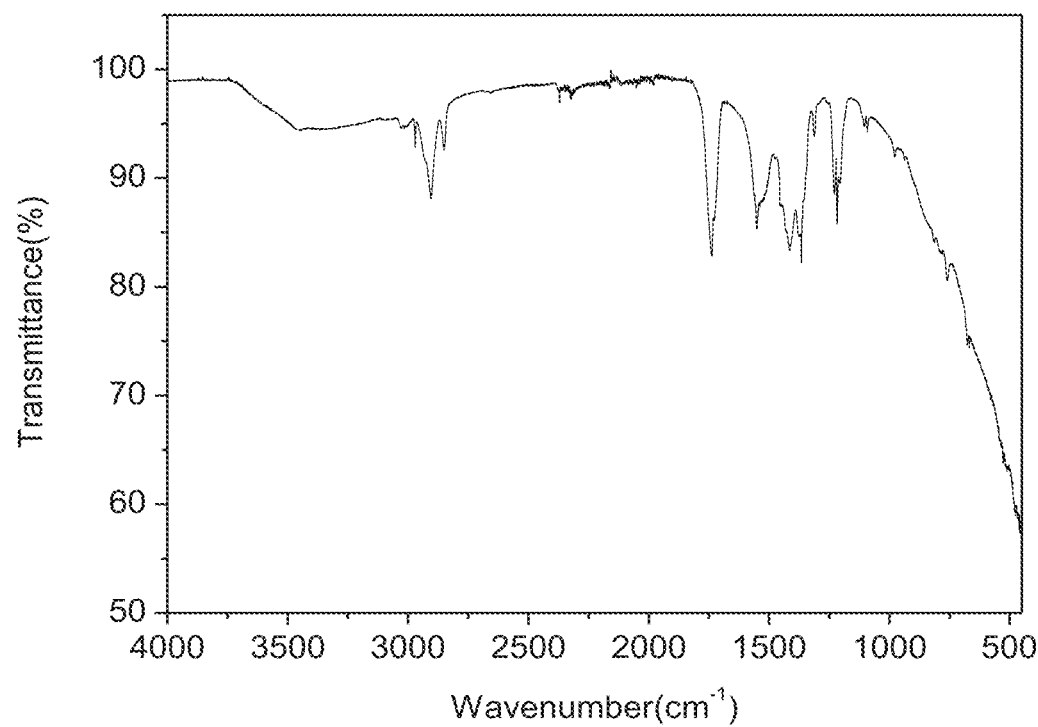
FIG. 7 is an IR spectrum of a nanocomposite formed from Mg/Al-adamantane intercalated LDH and decomposed at 450° C. in a hydrogen atmosphere in accordance with one or more embodiments of the present disclosure.

The nanocomposite was further characterized by IR spectroscopy, as shown in FIG. 7. The IR spectrum in FIG. 7 showed the symmetric and antisymmetric stretching vibrations of the COO— group at 1547 and 1417 $cm^{-1}$. The IR spectrum showed the vibrations of the C—H groups at 2904 and 2845 $cm^{-1}$. These vibration signals indicated the residual presence of adamantane ion in the layered metal nanocomposite after decomposition. The vibration at 1217 $cm^{-1}$ was due to the C—O stretch of the adamantane ion. IR spectrum showed a weak broad vibration centered around 3434 $cm^{-1}$ due to O—H stretching of the hydroxyl ions.

Figure 8:
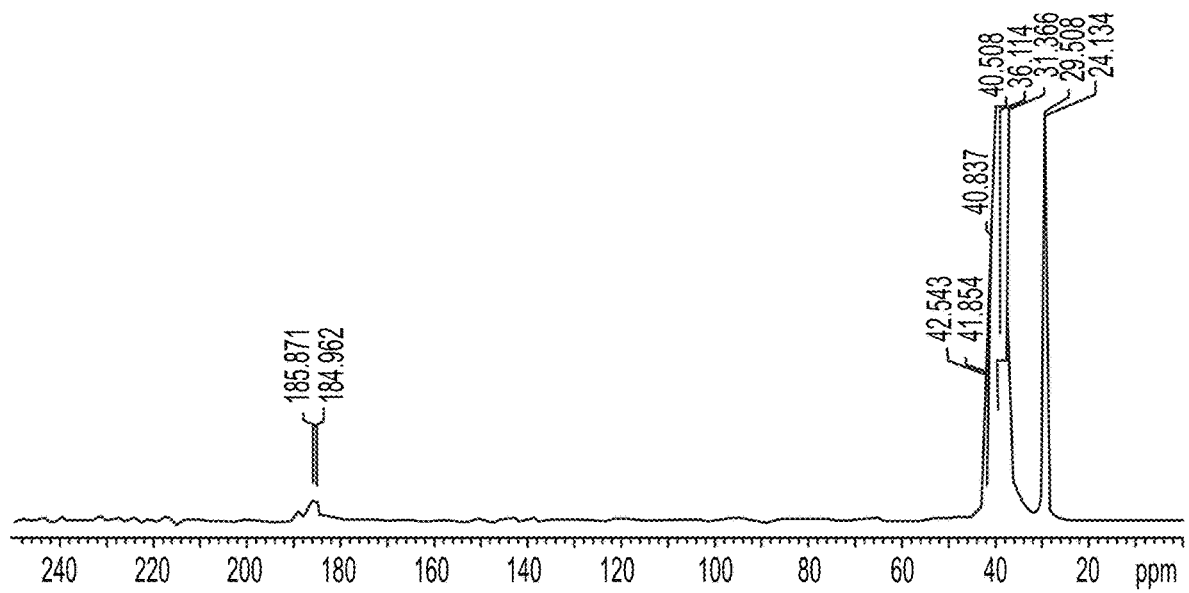
FIG. 8 is a $^{13}C$ NMR of a nanocomposite formed from Mg/Al-adamantane intercalated LDH and decomposed at 450° C. in a hydrogen atmosphere in accordance with one or more embodiments of the present disclosure.

Solid state NMR spectroscopy was used to gain the further structural information of the resultant layered metal nanocomposite. In FIG. 8, the $^{13}C$ NMR spectrum of the nanocomposite showed signals at 29.5, 37.3, 40.9, 42.3 ppm. These signals corresponded to the four unique carbon environments present in the adamantane ring. The signals in FIG. 8 are similar to the one observed in the Mg/Al-diamondoid intercalated LDH (FIG. 4), thus indicating that adamantane is present after decomposition. The signal at 186 ppm indicated the presence of the carbon of the carbonyl in carboxylate ion; this signal was similar to the Mg/Al-diamondoid intercalated LDH. However, a split was noticeable in all the signals including the one at 186 ppm. The splits, or overlapping signals, indicated the formation of the second type of adamantane ion, which was closely related to the parent adamantane ion. In addition to these signals, the resulting nanocomposite showed a carbon which resonates at 39.01 ppm. This signal did not appear in the $^{13}C$ NMR of the diamondoid-intercalated Mg/Al LDH (See FIG. 4). This signal could indicate the formation of new $sp^2$ carbon which acts as the link between individual adamantane molecules.

Figure 9:
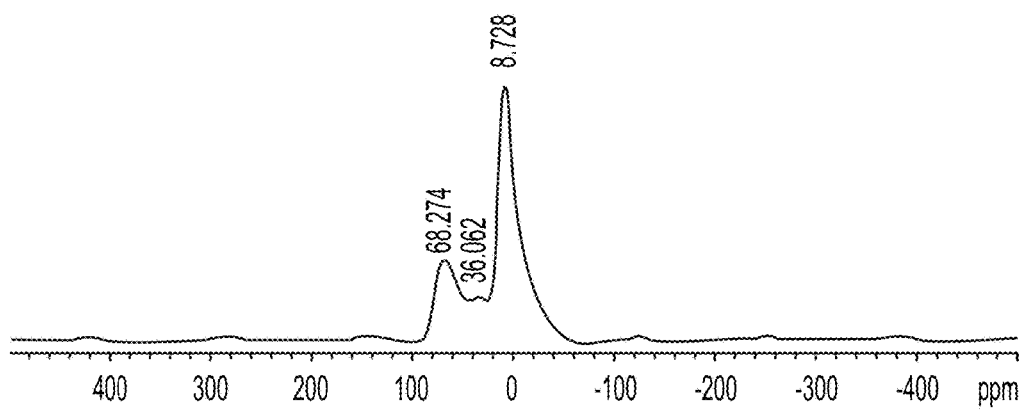
FIG. 9 is a $^{27}Al$ NMR of a nanocomposite formed from Mg/Al-adamantane intercalated LDH and decomposed at 450° C. in a hydrogen atmosphere in accordance with one or more embodiments of the present disclosure.
Figure 10A:
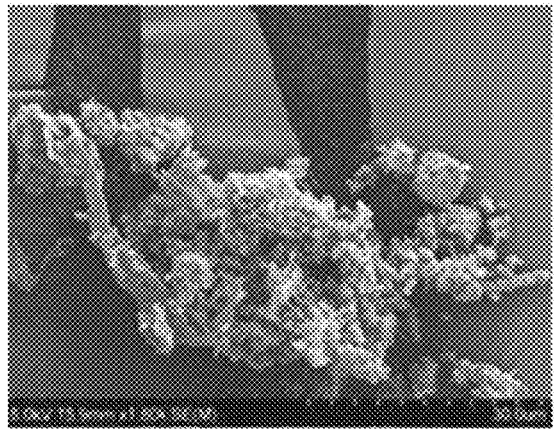
FIG. 10A-10D are SEM micrographs of a nanocomposite formed from Mg/Al-adamantane intercalated LDH and decomposed at 450° C. in a hydrogen atmosphere in accordance with one or more embodiments of the present disclosure.
Figure 10B:
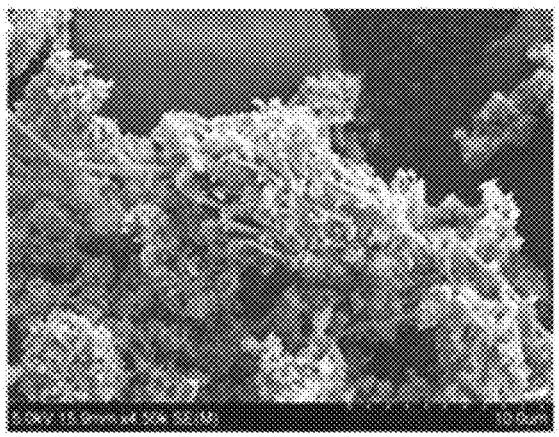
Figure 10C:
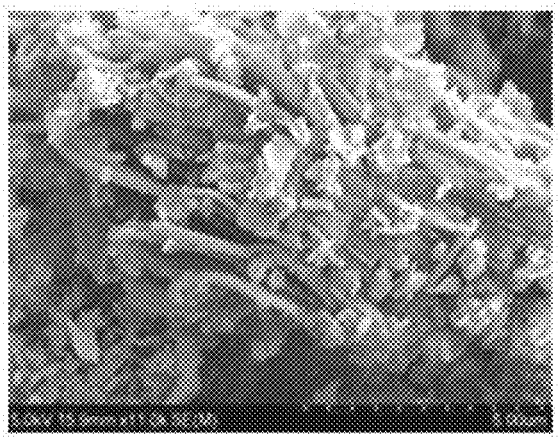
Figure 10D:
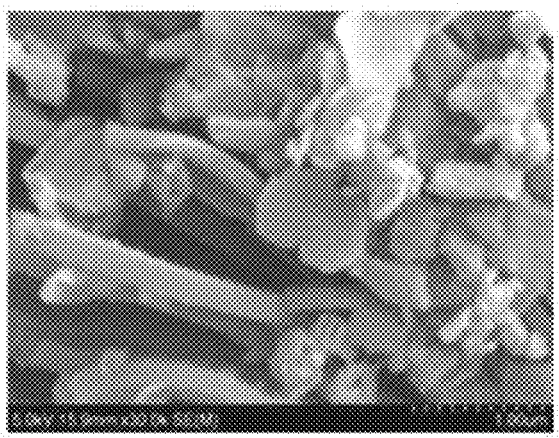
Figure 11A:
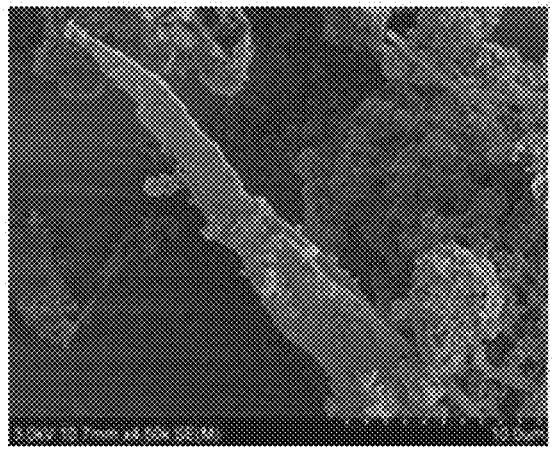
FIGS. 11A-11D are SEM micrographs of a nanocomposite formed from Mg/Al-adamantane intercalated LDH and decomposed at 450° C. in a hydrogen atmosphere in accordance with one or more embodiments of the present disclosure.
Figure 11B:
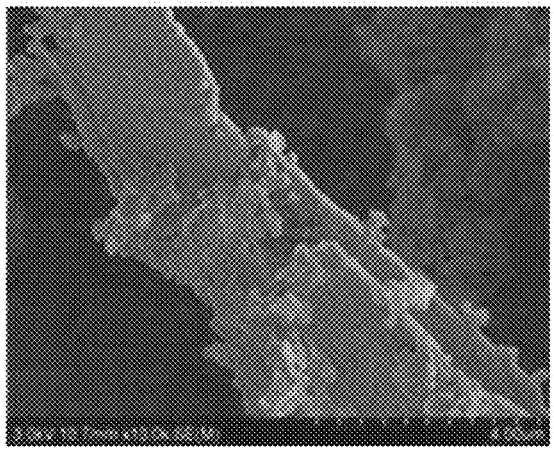
Figure 11C:
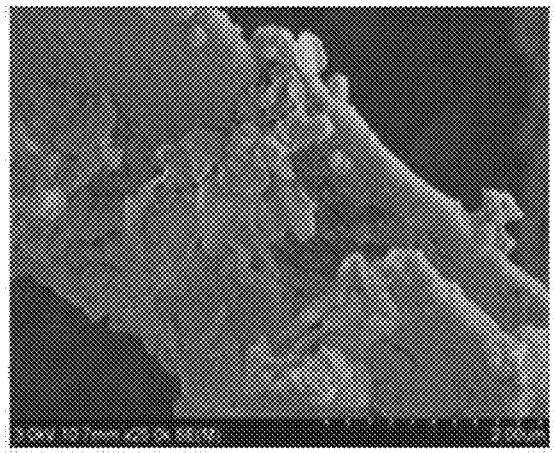
Figure 11D:
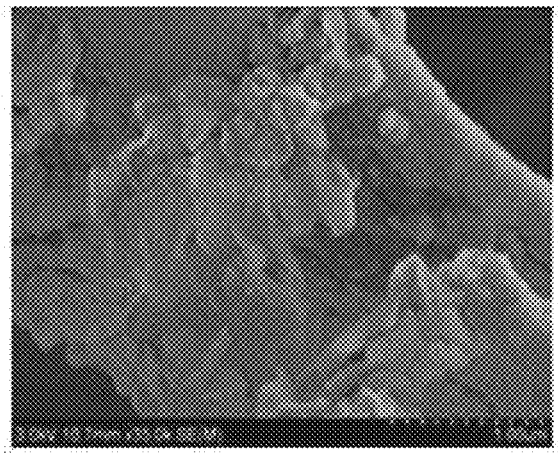
Figure 12A:
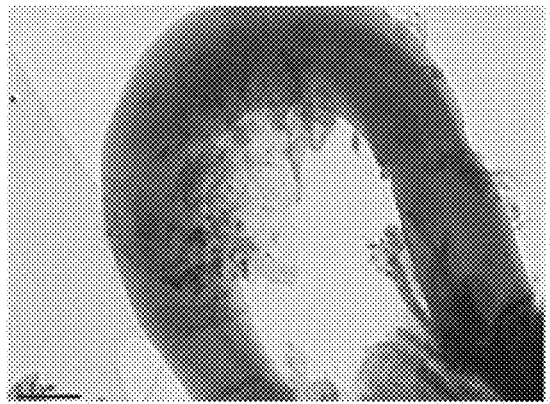
FIGS. 12A-12C are transition electron microscopy (TEM) micrographs of a nanocomposite formed from Mg/Al-adamantane intercalated LDH and decomposed at 450° C. in a hydrogen atmosphere in accordance with one or more embodiments of the present disclosure.
Figure 12B:
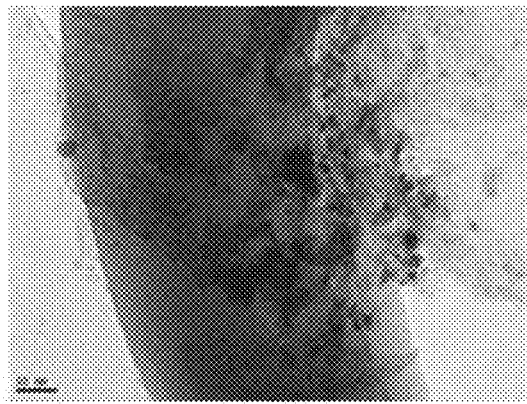
Figure 12C:
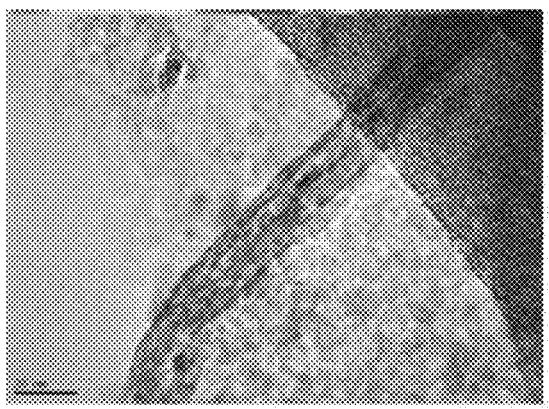
Figure 12D:
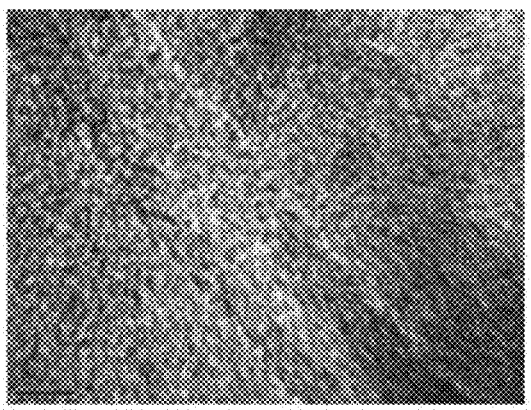
FIG. 12D is a high resolution transition electron microscopy (HRTEM) micrograph of a nanocomposite formed from Mg/Al-adamantane intercalated LDH and decomposed at 450° C. in a hydrogen atmosphere in accordance with one or more embodiments of the present disclosure.

A solid state Al NMR was performed to determine the chemical environment of the aluminum in the nanocomposite. In FIG. 9, the $^{27}Al$ NMR spectrum of the layered metal nanocomposite showed two intense signals at 8.7 and 69.2 ppm, which indicated that the $Al^{3+}$ could be in either an octahedral environment or tetrahedral environment. The approximate ratio of $Al^{3+}$ present in octahedral sites to $Al^{3+}$ present in tetrahedral site was about 3:1 determined by signal integration based on the intensity of the signal in the NMR. In addition, the small hump at 36 ppm indicated the presence of a small amount of $Al^{3+}$ in five coordinated geometries as well.

The surface morphology of the resultant nanocomposite was evaluated by SEM. The micrographs of FIGS. 10A-10D showed the formation of the layered metal nanocomposite resulting from the decomposition of Mg/Al-diamondoid intercalated LDH. The images that are platelets are mixed metal oxides and the fibrous or rod shaped objects are diamondoid sheets. The formation of the micron sized diamondoid sheets and submicron sized mixed metal oxides are much clearer in SEM of nanocomposite in FIG. 11A-D. The layer-interlayer or layer by layer nature of the as-prepared LDHs and its topotactic transformation into nanocomposite can be explained on the basis of SEM images (FIGS. 10A-11D). Generally, LDHs upon thermal decomposition lose intercalated water and anions and hydroxyls ions in step wise manner; as a result, the layered structure of the LDHs would collapse to form mixed metal oxides. However, the controlled decomposition under reduced atmosphere of Mg/Al-diamondoid intercalated LDH led to the fusion of individual adamantane ions to grow as higher/longer diamondoids in the interlayer galleries as evidence by the rod or fibers shown in the SEM micrographs. Additionally, during decomposition, the metal hydroxides in the layers have lost their hydroxyl ions resulting in the formation of metal oxides or the hydroxyl ions have been converted into the metal oxides. Due to the layer-interlayer nature of the LDHs, the resulting metal oxides in the layer are deposited on the higher/longer diamondoids formed in the interlayer leading to the formation of layer-by-layer assembly of nanocomposite at the molecular level.

Figure 13A:
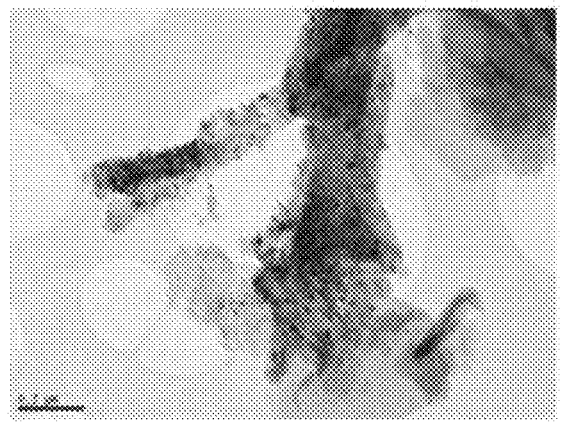
FIGS. 13A-13C are TEM micrographs of a nanocomposite formed from Mg/Al-adamantane intercalated LDH and decomposed at 450° C. in a hydrogen atmosphere in accordance with one or more embodiments of the present disclosure.
Figure 13B:
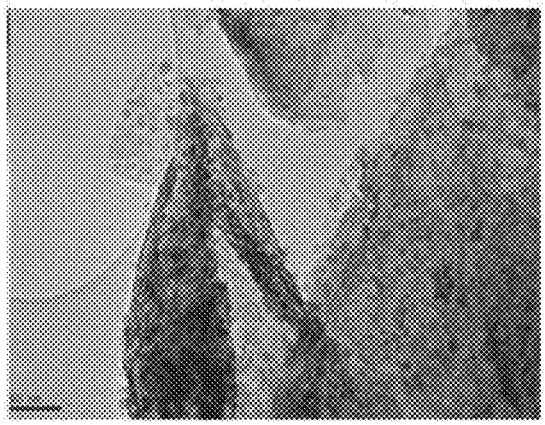
Figure 13C:
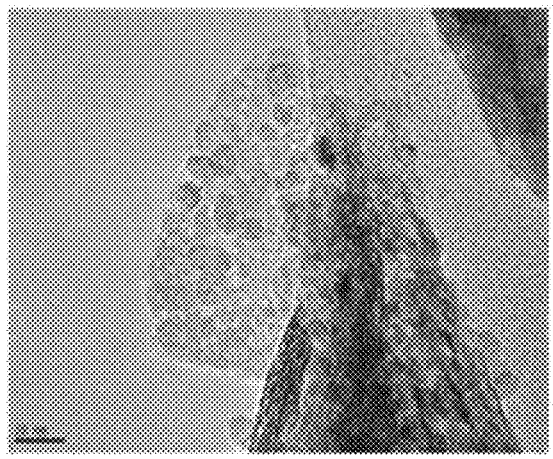
Figure 13D:
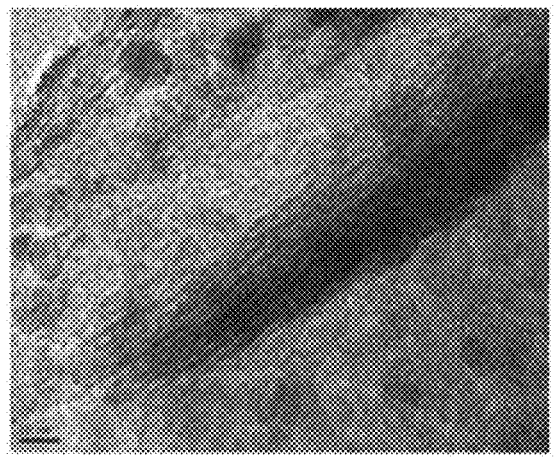
FIG. 13D is a HRTEM micrograph of a nanocomposite formed from Mg/Al-adamantane intercalated LDH and decomposed at 450° C. in a hydrogen atmosphere in accordance with one or more embodiments of the present disclosure.

HRTEM and TEM were used to understand the layer by layer assembly of resultant nanocomposite. FIGS. 12A-13D show the several bright field images. FIGS. 13A-13C are TEM images of the nanocomposite, and FIG. 13D is an HRTEM image of the nanocomposite. The diamondoids are tubular/fibrous in nature, having length of several micron and diameter of around 2-5 nm. The long chain diamondoids are uniformly anchored within the mixed metal oxides having uniform size of around 10 nm. In addition to the formation of the nanocomposite, the various embodiments of the methods for preparing layered metal nanocomposites described a method of controlling the size of the mixed metal oxide nanoparticles in the composite.

Figure 14:
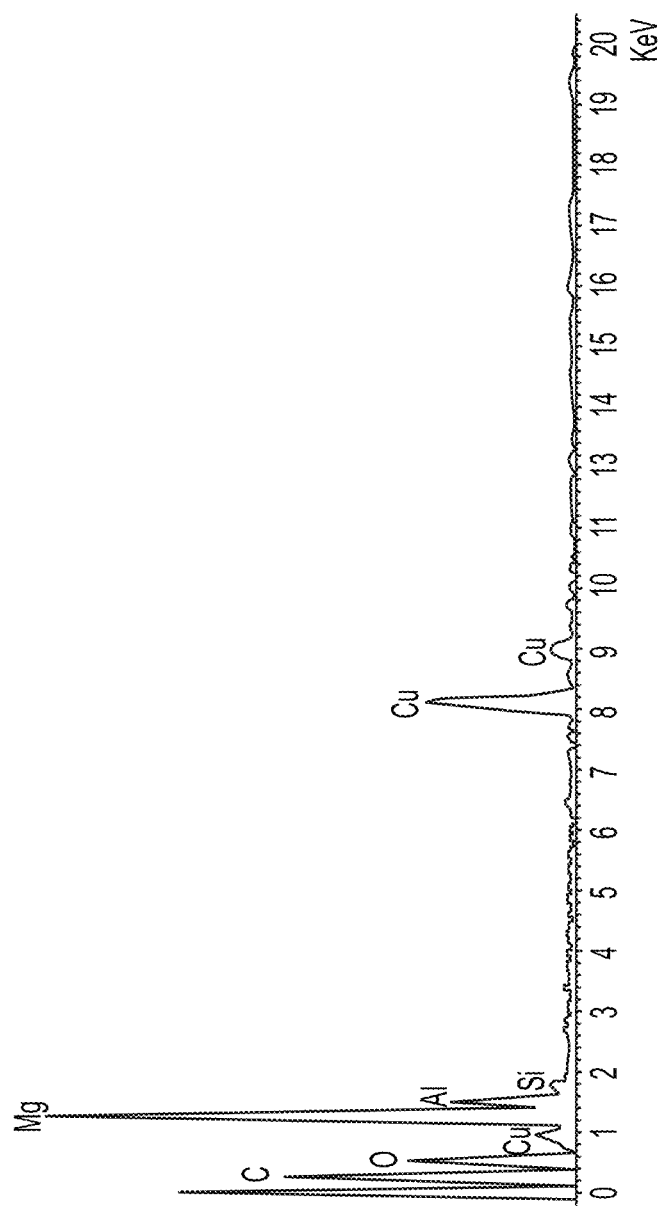
FIG. 14 is an energy dispersive X-ray (EDX) spectrum of a nanocomposite formed from Mg/Al-adamantane intercalated LDH and decomposed at 450° C. in a hydrogen atmosphere in accordance with one or more embodiments of the present disclosure.

The elemental analysis of the resulting layered metal nanocomposite was carried out using EDX analysis by making use of the same sample grid which was used for the HRTEM analysis. The results of the elemental analysis are shown in FIG. 14. The approximate quantities of different elements in the nanocomposites were arrived at by using the intensity of the individual element peaks in the EDX spectra. The ratio of mixed metal oxide to carbon was found to be around 4. The atomic distribution in the layered metal nanocomposite was characterized using STEM technique (FIG. 15A-15D). Mg, O and C have uniform atomic distribution across the sample. The Al appeared in patches or was segregated in pockets as expected for the mixed metal oxides of LDHs.

It should be understood that the various aspects of the methods for preparing a layered metal nanocomposite, a layered metal nanocomposite prepared according to the same, and a catalyst system comprising the layered metal nanocomposite prepared according to the same are described and such aspects may be utilized in conjunction with various other aspects.

In a first aspect, the disclosure provides a method for preparing a layered metal nanocomposite. The method comprises mixing a magnesium salt and an aluminum salt to form a $Mg^{2+}/Al^{3+}$ solution, in which the Mg/Al has a molar ratio of between 0.5:1 to 6:1. Further, the method includes adding a diamondoid compound to the $Mg^{2+}/Al^{3+}$ solution to form a reactant mixture, in which the diamondoid compound has at least one carboxylic acid moiety and heating the reactant mixture at a reaction temperature for a reaction time to form a Mg/Al-diamondoid intercalated layered double hydroxide. Finally, the method includes thermally decomposing the Mg/Al-diamondoid intercalated layered double hydroxide under a reducing atmosphere for a decomposition time at a decomposition temperature to form the layered metal nanocomposite.

In a second aspect, the disclosure provides the method of the first aspect, in which the aluminum salt and the diamondoid compound are mixed in amounts that provide a ratio of $Al^{3+}$ to diamondoid compound in the reactant mixture of from 0.5:1 to 2:1.

In a third aspect, the disclosure provides the method of the first or second aspects, in which the magnesium salt is $Mg(OH)_2$.

In a fourth aspect, the disclosure provides the method of any of the first through third aspects, in which the aluminum salt is $Al(OH)_3$.

In a fifth aspect, the disclosure provides the method of any of the first through fourth aspects, in which the diamondoid compound is 1-adamantane carboxylic acid.

In a sixth aspect, the disclosure provides the method of any of the first through fifth aspects, in which the $Mg^{2+}/Al^{3+}$ solution is an aqueous solution.

In a seventh aspect, the disclosure provides the method of any of the first through sixth aspects, in which the reaction temperature is from 100° C. to 180° C.

In an eighth aspect, the disclosure provides the method of any of the first through seventh aspects, in which the reaction temperature is from 140° C. to 160° C.

In a ninth aspect, the disclosure provides the method of any of the first through eighth aspects, in which the decomposition temperature is from 220° C. to 450° C.

In a tenth aspect, the disclosure provides the method of any of the first through ninth aspects, in which the decomposition temperature is from 300° C. to 450° C.

In an eleventh aspect, the disclosure provides the method of any of the first through tenth aspects, in which the decomposition time is at least 4 hours.

In a twelfth aspect, the disclosure provides the method of any of the first through eleventh aspects, in which the reducing atmosphere comprises hydrogen gas.

In a thirteenth aspect, the disclosure provides the method of any of the first through twelfth aspects, in which the layered metal nanocomposite comprises a layered morphology of a plurality of octahedral and tetrahedral environments.

In a fourteenth aspect, the disclosure provides a layered metal nanocomposite prepared according to the method of any of the first through thirteenth aspects.

In a fifteenth aspect, the disclosure provides a catalyst system comprising the layered metal nanocomposite of the fourteenth aspect.

In a sixteenth aspect, the disclosure provides the catalyst system of the fifteenth aspect, in which the layered metal nanocomposite comprises a Powder X-Ray Diffraction (PXRD) pattern having multiple reflections at lower than 42.71 (2.11 Å) and 62.2° 2° (1.49 Å).

It will be apparent to those skilled in the art that various modifications and variations can be made to the embodiments described in this specification without departing from the spirit and scope of the claimed subject matter. Thus it is intended that the specification cover the modifications and variations of the various embodiments described in this specification provided such modifications and variations come within the scope of the appended claims and their equivalents.

The invention claimed is:

1. A layered metal nanocomposite prepared by:
   mixing a magnesium salt and an aluminum salt to form a $Mg^{2+}/Al^{3+}$ solution, in which the Mg/Al has a molar ratio of between 0.5:1 to 6:1;
   adding a diamondoid compound to the $Mg^{2+}/Al^{3+}$ solution to form a reactant mixture, in which the diamondoid compound has at least one carboxylic acid moiety;
   heating the reactant mixture at a reaction temperature for a reaction time to form a Mg/Al-diamondoid intercalated layered double hydroxide; and
   thermally decomposing the Mg/Al-diamondoid intercalated layered double hydroxide under a reducing atmosphere for a decomposition time at a decomposition temperature to form the layered metal nanocomposite.

2. The layered metal nanocomposite of claim 1, in which the layered metal nanocomposite comprises 50 wt. % to 90 wt. % MgO particles and from 10 wt. % to 50 wt. % adamantane-derived carbon, based on the total weight of the layered metal nanocomposite.

3. The layered metal nanocomposite of claim 1, in which the layered metal nanocomposite comprises a Powder X-Ray Diffraction (PXRD) pattern having multiple basal reflections at 2θ values lower than 42.71°.

4. The layered metal nanocomposite of claim 1, in which the layered metal nanocomposite comprises a Powder X-Ray Diffraction (PXRD) pattern having basal reflections at a 2θ value of approximately 6.61°.

5. The layered metal nanocomposite of claim 1, in which the layered metal nanocomposite comprises a Powder X-Ray Diffraction (PXRD) pattern having basal reflections at a 2θ value of approximately 7.98°.

6. The layered metal nanocomposite of claim 1, in which the layered metal nanocomposite comprises a Powder X-Ray Diffraction (PXRD) pattern having basal reflections at a 2θ value of approximately 9.23°.

7. The layered metal nanocomposite of claim 1, in which the layered metal nanocomposite comprises a Powder X-Ray Diffraction (PXRD) pattern having basal reflections at a 2θ value of approximately 11.49°.

8. The layered metal nanocomposite of claim 1, in which the layered metal nanocomposite comprises a Powder X-Ray Diffraction (PXRD) pattern having basal reflections at 2θ values of approximately 6.61°, approximately 7.98°, approximately 9.23°, and approximately 11.49°.

9. The layered metal nanocomposite of claim 1, in which the layered metal nanocomposite comprises mixed metal oxides and fibrous or rod shaped diamondoids.

10. The layered metal nanocomposite of claim 9, in which the fibrous or rod shaped diamondoids comprise a length of 2 or more micrometers and a diameter of 2 to 5 nanometers.

11. The layered metal nanocomposite claim 1, in which the magnesium salt is $Mg(OH)_2$ and the aluminum salt is $Al(OH)_3$.

12. The layered metal nanocomposite of claim 1, in which the diamondoid compound is 1-adamantane carboxylic acid.

13. The layered metal nanocomposite of claim 1, in which the reducing atmosphere comprises hydrogen gas.

14. The layered metal nanocomposite of claim 1, in which the layered metal nanocomposite comprises a layered morphology of a plurality of octahedral and tetrahedral environments.

15. A catalyst system comprising:
   a layered metal nanocomposite prepared by:
      mixing a magnesium salt and an aluminum salt to form a $Mg^{2+}/Al^{3+}$ solution, in which the Mg/Al has a molar ratio of between 0.5:1 to 6:1;
      adding a diamondoid compound to the $Mg^{2+}/Al^{3+}$ solution to form a reactant mixture, in which the diamondoid compound has at least one carboxylic acid moiety;
      heating the reactant mixture at a reaction temperature for a reaction time to form a Mg/Al-diamondoid intercalated layered double hydroxide; and
      thermally decomposing the Mg/Al-diamondoid intercalated layered double hydroxide under a reducing atmosphere for a decomposition time at a decomposition temperature to form the layered metal nanocomposite.

16. The catalyst system of claim 15, in which the layered metal nanocomposite comprises 50 wt. % to 90 wt. % MgO particles and from 10 wt. % to 50 wt. % adamantane-derived carbon, based on the total weight of the layered metal nanocomposite.

17. The catalyst system of claim 15, in which the layered metal nanocomposite comprises a Powder X-Ray Diffraction (PXRD) pattern having multiple basal reflections at 2θ values lower than 42.71°.

18. The catalyst system of claim 15, in which the layered metal nanocomposite comprises a Powder X-Ray Diffraction (PXRD) pattern having basal reflections at 2θ values of approximately 6.61°, approximately 7.98°, approximately 9.23°, and approximately 11.49°.

19. The catalyst system of claim 15, in which the layered metal nanocomposite comprises mixed metal oxides and fibrous or rod shaped diamondoids.

20. The catalyst system of claim 15, in which the fibrous or rod shaped diamondoids comprise a length of 2 or more micrometers and a diameter of 2 to 5 nanometers.

* * * * *